US011313250B2

(12) United States Patent
Subbarayachar et al.

(10) Patent No.: US 11,313,250 B2
(45) Date of Patent: Apr. 26, 2022

(54) FRANGIBLE STRUT FOR GAS TURBINE ENGINE

(71) Applicant: HONEYWELL INTERNATIONAL INC., Morris Plains, NJ (US)

(72) Inventors: Manjunath Subbarayachar, Bangalore (IN); Anil Kumar Thokala, Bangalore (IN); Jayanth Hirebelaguly Shivaprakash, Bangalore (IN); Pavankumar Kadam, Bangalore (IN); Avinash Kumar, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/929,502

(22) Filed: Jul. 15, 2020

(65) Prior Publication Data

US 2020/0347751 A1 Nov. 5, 2020

Related U.S. Application Data

(62) Division of application No. 16/141,526, filed on Sep. 25, 2018, now Pat. No. 10,837,320.

(51) Int. Cl.
*F01D 25/28* (2006.01)
*F01D 25/24* (2006.01)

(52) U.S. Cl.
CPC .............. *F01D 25/28* (2013.01); *F01D 25/24* (2013.01); *F05D 2240/14* (2013.01); *F05D 2260/311* (2013.01)

(58) Field of Classification Search
CPC ........ F01D 25/24; F01D 25/28; F01D 25/162; F01D 21/045; F05D 2260/311
See application file for complete search history.

(56) References Cited

U.S. PATENT DOCUMENTS

| 5,088,279 A | * | 2/1992 | MacGee | ................... F02C 7/20 60/226.1 |
| 5,873,547 A | | 2/1999 | Dunstan | |
| 6,357,220 B1 | | 3/2002 | Snyder et al. | |
| 6,402,469 B1 | * | 6/2002 | Kastl | ..................... F01D 21/045 416/2 |

(Continued)

FOREIGN PATENT DOCUMENTS

| GB | 2326679 A | 12/1998 |
| GB | 2401651 A | 11/2004 |
| GB | 2490781 A | 11/2012 |

*Primary Examiner* — Brian P Wolcott
*Assistant Examiner* — Jackson N Gillenwaters
(74) *Attorney, Agent, or Firm* — Lorenz & Kopf, LLP

(57) ABSTRACT

A frangible strut for a gas turbine engine includes a first end to couple to a first structure of the gas turbine engine, and a second end opposite the first end. The second end is to couple to a second structure of the gas turbine engine. The second end includes an outer portion coaxial with and spaced radially apart from an inner portion. The inner portion is to receive a fastening device to couple the second end to the second structure. The outer portion is coupled to a body of the frangible strut. The inner portion is interconnected to the outer portion by a plurality of frangible members that are spaced apart about a perimeter of the inner portion, and each of the frangible members are configured to release the inner portion from the outer portion. The frangible strut includes the body interconnecting the first end and the second end.

17 Claims, 21 Drawing Sheets

(56) References Cited

U.S. PATENT DOCUMENTS

| | | |
|---|---|---|
| 6,547,518 B1 | 4/2003 | Czachor et al. |
| 7,093,996 B2 | 8/2006 | Wallace et al. |
| 7,143,877 B2 | 12/2006 | Dusserre-Telmon et al. |
| 9,121,347 B2 | 9/2015 | Bellabal et al. |
| 9,500,133 B2 | 11/2016 | Davis et al. |
| 10,578,204 B2 | 3/2020 | Martin |
| 2004/0006967 A1 | 1/2004 | Clark |
| 2013/0014515 A1 | 1/2013 | Bellabal et al. |
| 2013/0084174 A1* | 4/2013 | Maalouf .................. F02C 7/20 415/208.1 |
| 2017/0306851 A1 | 10/2017 | Jiang et al. |

\* cited by examiner

FRANGIBLE STRUT FOR GAS TURBINE ENGINE

CROSS-REFERENCE TO RELATED APPLICATION

This application is a divisional of U.S. patent application Ser. No. 16/141,526, filed on Sep. 25, 2018. The relevant disclosure of the above application is incorporated herein by reference.

TECHNICAL FIELD

The present disclosure generally relates to gas turbine engines, and more particularly relates to a frangible strut for a gas turbine engine.

BACKGROUND

Gas turbine engines may be employed to power various devices. For example, a gas turbine engine may be employed to power a mobile platform, such as an aircraft. Generally, gas turbine engines have an engine core, in which gas is combusted to generate a hot combustive gas flow. In certain instances, the gas turbine engine may also include an outer bypass duct, which surrounds the engine core. The outer bypass duct may provide cooling air for components of the gas turbine engine, and may support other components associated with the gas turbine engine, such as components associated with a thrust reverser assembly. In certain instances, a connecting structure may be provided to connect the engine core with the outer bypass duct to maintain tighter rotor-structure clearances. In these instances, a load generated by the engine core may be directly transferred to the outer bypass duct by the connecting structure. The transferred loads or forces may affect the operation of the outer bypass duct and/or components associated with the outer bypass duct, such as the components of the thrust reverser assembly.

Accordingly, it is desirable to provide a connecting structure, such as a frangible strut, for a gas turbine engine, that interconnects the engine core and the outer bypass duct, but eliminates or removes a load path between the engine core and the outer bypass duct above a pre-defined threshold force. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a frangible strut for a gas turbine engine. The frangible strut includes a first end to couple to a first structure of the gas turbine engine, and a second end opposite the first end. The second end is to couple to a second structure of the gas turbine engine. The second end includes an outer portion coaxial with and spaced radially apart from an inner portion. The inner portion is configured to receive a fastening device to couple the second end to the second structure. The outer portion is coupled to a body of the frangible strut. The inner portion is interconnected to the outer portion by a plurality of frangible members that are spaced apart about a perimeter of the inner portion, and each of the frangible members are configured to release the inner portion from the outer portion. The frangible strut includes the body interconnecting the first end and the second end.

Also provided according to various embodiments is a frangible strut for a gas turbine engine. The frangible strut includes a first end to couple to a first structure of the gas turbine engine, and a second end opposite the first end. The second end to couple to a second structure of the gas turbine engine. The frangible strut includes a body interconnecting the first end and the second end. The body includes a first body portion and a second body portion. The first body portion extends along a first axis, the second body portion extends along a second axis, and the first axis is different than and parallel to the second axis. The first body portion is interconnected to the second body portion by a frangible portion and the frangible portion is configured to release the first body portion from the second body portion.

Further provided according to various embodiments is a gas turbine engine. The gas turbine engine includes a first structure and a second structure spaced apart from the first structure. The gas turbine engine includes at least one frangible strut having a first end coupled to the first structure and a second end coupled to the second structure. The second end is opposite the first end. The frangible strut includes a body that interconnects the first end and the second end. One of the second end or the body of the frangible strut includes a plurality of frangible members configured to remove a load path from the first structure to the second structure.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
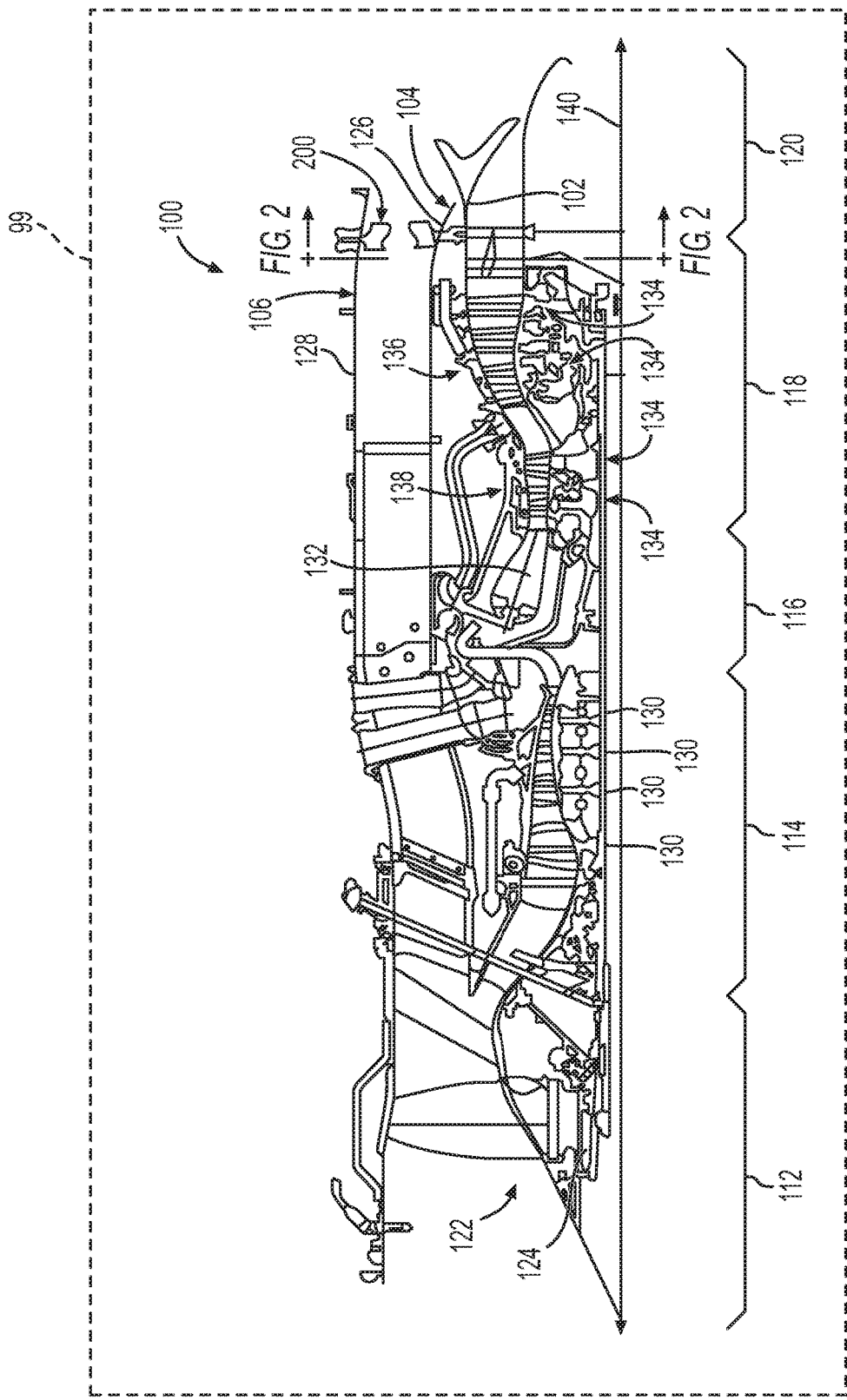
FIG. 1 is a schematic cross-sectional illustration of a gas turbine engine, which includes an exemplary frangible strut for a gas turbine engine in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of connecting structure or strut that would benefit from having a frangible end that eliminates a load path between the connected components, and the frangible strut described herein for a gas turbine engine is merely one exemplary embodiment according to the present disclosure. In addition, while the frangible strut is described herein as being used with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction. As used herein, the term "transverse" denotes an axis that crosses another axis at an angle such that the axis and the other axis are neither substantially perpendicular nor substantially parallel. Also as used herein, the terms "integrally formed" and "integral" mean one-piece and exclude brazing, fasteners, or the like for maintaining portions thereon in a fixed relationship as a single unit.

With reference to FIG. 1, a partial, cross-sectional view of an exemplary gas turbine engine 100 is shown with the remaining portion of the gas turbine engine 100 being substantially axisymmetric about a longitudinal axis 140, which also comprises an axis of rotation for the gas turbine engine 100. In the depicted embodiment, the gas turbine engine 100 is an annular multi-spool turbofan gas turbine jet engine within an aircraft 99, although other arrangements and uses may be provided. As will be discussed herein, the gas turbine engine 100 includes a frangible strut 200, which is coupled between or connects an exhaust guide vane 126 of an engine core 104 with an outer bypass duct 106. The frangible strut 200 includes an end that is frangible to reduce a load path between the engine core 104 and the outer bypass duct 106. By eliminating or removing the load path through the use of the frangible strut 200 above a pre-defined threshold load generated by the engine core 104, loads encountered by the outer bypass duct 106 are reduced, which prolongs a life of the outer bypass duct 106, and components coupled to the outer bypass duct 106, such as components associated with a thrust reverser assembly (not shown). In addition, in certain instances, the frangible strut 200 also reduces loads induced on mounts that connect the gas turbine engine 100 to the aircraft 99.

In this example, with continued reference to FIG. 1, the gas turbine engine 100 includes a fan section 112, a compressor section 114, a combustor section 116, a turbine section 118, and an exhaust section 120. In one example, the fan section 112 includes a fan 122 mounted on a rotor 124 that draws air into the gas turbine engine 100 and accelerates it. A fraction of the accelerated air exhausted from the fan 122 is directed through the outer bypass duct 106 and the remaining fraction of air exhausted from the fan 122 is directed into the compressor section 114. The outer bypass duct 106 is generally defined by an outer casing 128 that is spaced apart from and surrounds the exhaust guide vane 126. As will be discussed, the frangible strut 200 generally extends from the exhaust guide vane 126 to the outer casing 128 of the outer bypass duct 106.

In the embodiment of FIG. 1, the compressor section 114 includes one or more compressors 130. The number of compressors in the compressor section 114 and the configuration thereof may vary. The one or more compressors 130 sequentially raise the pressure of the air and direct a majority of the high pressure air into the combustor section 116. A fraction of the compressed air bypasses the combustor section 116 and is used to cool, among other components, turbine blades in the turbine section 118.

In the embodiment of FIG. 1, in the combustor section 116, which includes a combustion chamber 132, the high pressure air is mixed with fuel, which is combusted. The high-temperature combustion air or combustive gas flow is directed into the turbine section 118. In this example, the turbine section 118 includes one or more turbines 134 disposed in axial flow series. It will be appreciated that the number of turbines, and/or the configurations thereof, may vary. The combustive gas expands through and rotates the turbines 134. The combustive gas flow then exits turbine section 118 for mixture with the cooler bypass airflow from the outer bypass duct 106 and is ultimately discharged from gas turbine engine 100 through exhaust section 120. As the turbines 134 rotate, each drives equipment in the gas turbine engine 100 via concentrically disposed shafts or spools. Generally, the turbines 134 in the turbine section 118, the compressors 130 in the compressor section 114 and the fan 122 are mechanically linked by one or more shafts or spools. For example, in a two spool turbofan engine platform, the turbine rotors contained within a high pressure (HP) turbine stage 136 may be rotationally fixed to the compressors 130 contained within compressor section 114 by a HP shaft, while the turbines 134 contained within a low pressure (LP) turbine stage 138 may be rotationally fixed to the rotor 124 of the fan 122 by a coaxial LP shaft. In other embodiments, gas turbine engine 100 may be a single spool engine or a multi-spool engine containing more than two coaxial shafts.

Figure 2:
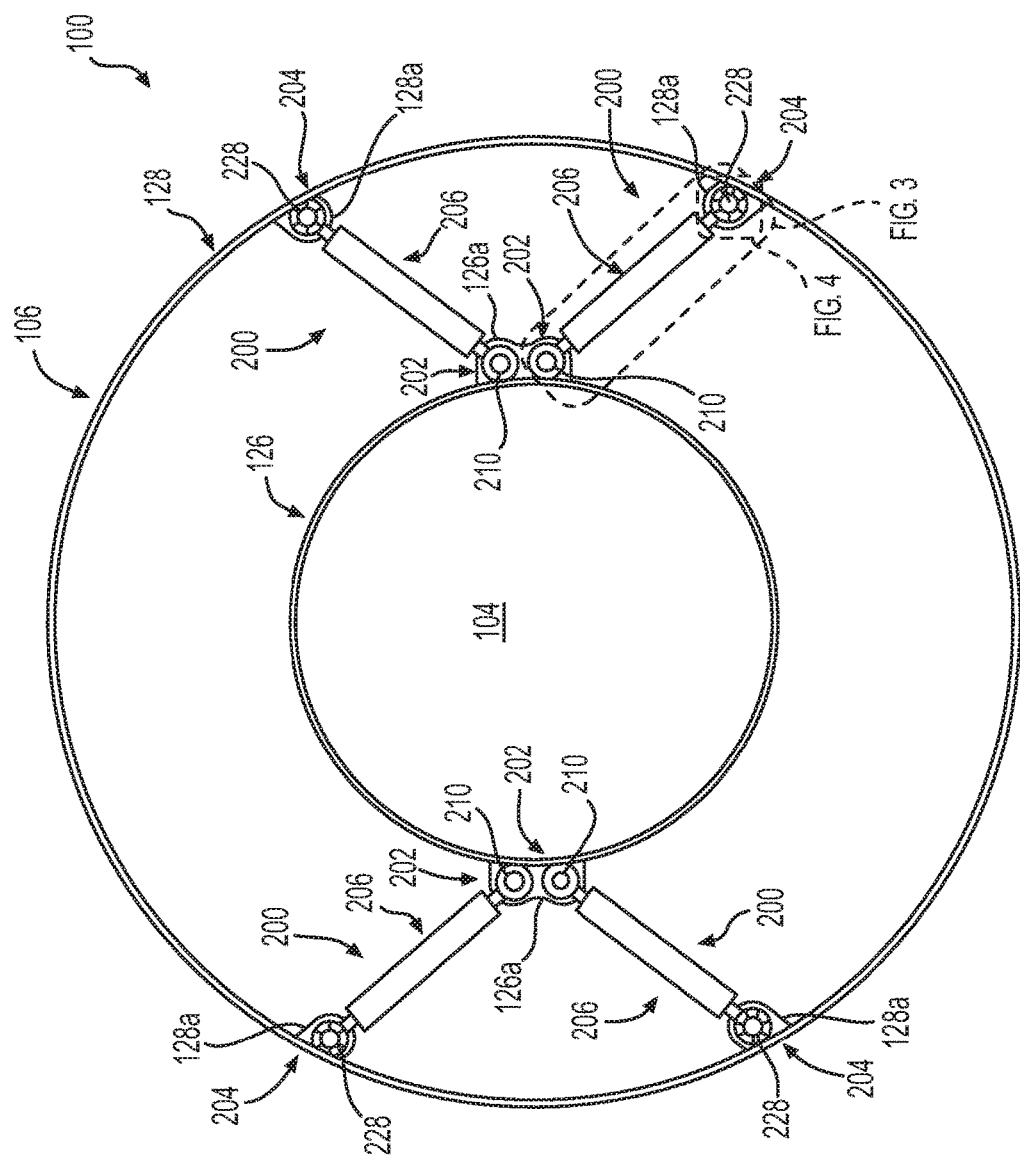
FIG. 2 is a schematic cross-sectional view of the gas turbine engine of FIG. 1, taken along line 2-2 of FIG. 1 into the page, in which a plurality of the frangible struts are coupled between a first structure of the gas turbine engine and a second structure of the gas turbine engine, and the gas turbine engine is in a first operating state.

With reference to FIG. 2, a cross-sectional schematic front view of a portion of the gas turbine engine 100 is shown. In the example of FIG. 2, four frangible struts 200 are employed to couple or connect the exhaust guide vane 126 of the engine core 104 with the outer bypass duct 106. It should be noted that the location of the frangible struts 200 in FIG. 2 is merely exemplary, as the frangible struts 200 may be positioned at any desired location to couple the engine core 104 to the outer bypass duct 106. Moreover, the number of frangible struts 200 is merely exemplary, as any number of frangible struts 200 may be employed depending upon the size of the engine core 104, for example. In this example, each of the frangible struts 200 is coupled to the exhaust guide vane 126, which surrounds and is coupled to the engine core 104, and the outer casing 128 of the outer bypass duct 106. Each of the frangible struts 200 have a first end 202 and an opposite second end 204, with a body 206 interconnecting the first end 202 and the second end 204. The first end 202 is coupled to a first structure of the gas turbine engine 100, which in this example is the exhaust guide vane 126 of the engine core 104, and the second end 204 is coupled to a second structure of the gas turbine engine 100, which in this example, is the outer casing 128 of the outer bypass duct 106. In one example, the exhaust guide vane 126 includes a plurality of mounting lugs 126a, which are each coupled to the first end 202 of a respective one of the frangible struts 200. In this example, the exhaust guide vane 126 includes two mounting lugs 126a, which define a pair of bores for coupling to the first end 202 of a pair of the frangible struts 200. In one example, the outer casing 128 includes a plurality of mounting lugs 128a, which are each coupled to the second end 204 of a respective one of the frangible struts 200. In this example, the outer casing 128 includes four mounting lugs 128a, which each define a bore for coupling to the second end 204 of the four frangible struts 200. It should be noted that the shape and the location of each of the mounting lugs 126a, 128a are merely exemplary, as the mounting lugs 126a, 128a may have any desired shape and may be positioned at any desired location to enable the coupling of the exhaust guide vane 126 to the outer casing 128 by the plurality of frangible struts 200. As each of the frangible struts 200 is the same, only one of the frangible struts 200 will be described in detail herein for ease of description.

Figure 3:
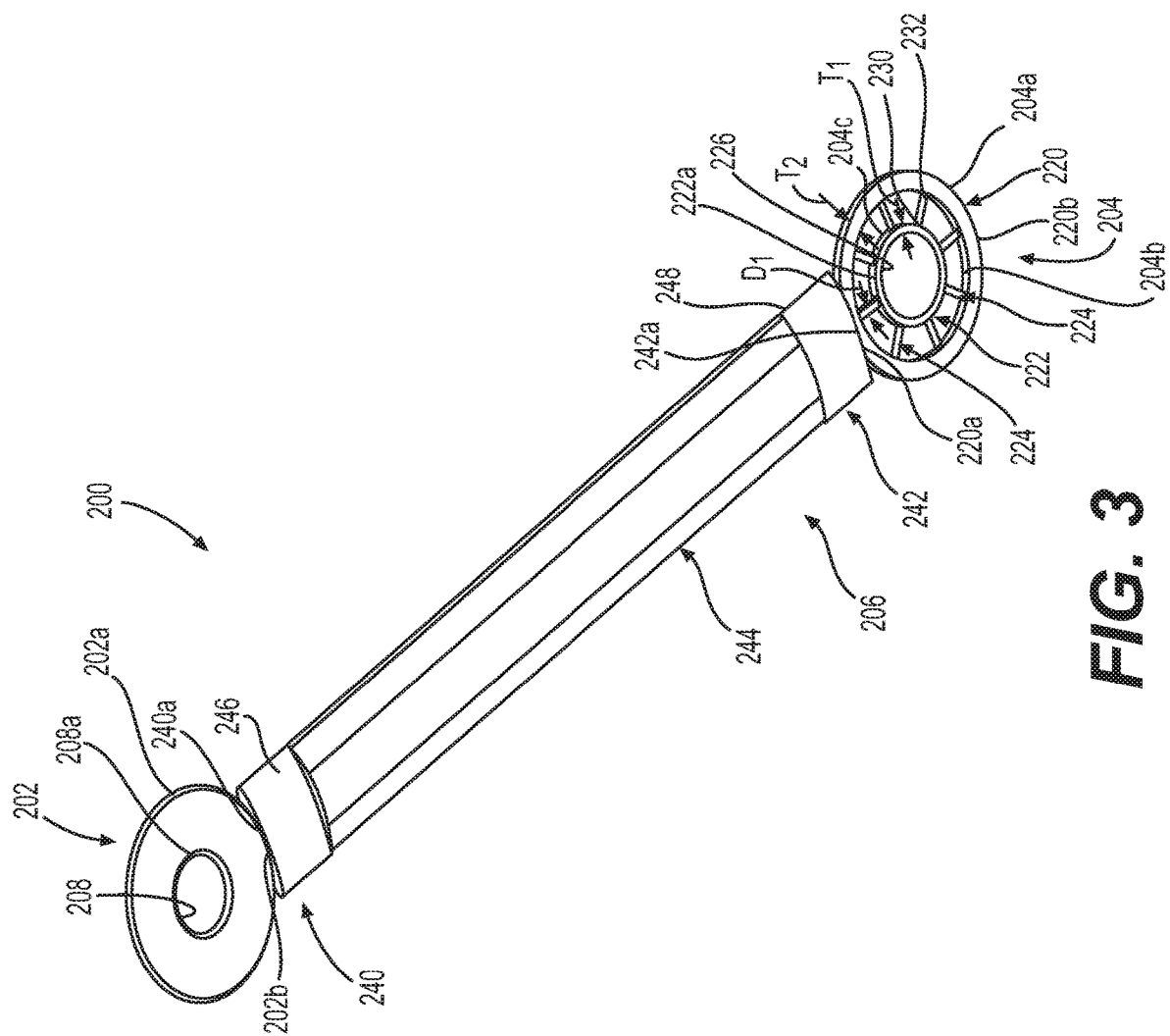
FIG. 3 is a perspective view of one frangible strut of the plurality of frangible struts of FIG. 2, taken at detail 3 on FIG. 2.

With reference to FIG. 3, the frangible strut 200 is shown in greater detail. The frangible strut 200 is composed of a metal or metal alloy, including, but not limited to steel, nickel alloy, aluminum and titanium. In other embodiments, the frangible strut 200 may be composed of a polymer-based material, including, but not limited to Para-aramids, Polyamide 11 & 12, and copolyamide. In one example, the frangible strut 200 is an integral component, and is formed through any suitable process, including, but not limited to, forging, casting, direct metal laser sintering (DMLS), laser powder bed fusion (L-PBF), electron powder bed fusion (E-PBF), electron beam melting (EBM), etc. In this example, the first end 202 is integrally formed with, one-piece or monolithic with the body 206. The first end 202 is substantially annular or disc-shaped, and has a thickness that is less than a thickness of the body 206. The reduced thickness of the first end 202 assists in coupling the first end 202 to the engine core 104. The first end 202 defines a first bore 208. The first bore 208 receives a fastening device, for example a mechanical fastener, such as a bolt 210 (FIG. 2), for coupling the first end 202 to the respective mounting lug 126a of the exhaust guide vane 126. It should be noted that the use of the bolt 210 (FIG. 2) is merely exemplary, as any suitable mechanical fastener may be employed to couple the first end 202 to the exhaust guide vane 126. The first end 202 is generally solid between an inner perimeter or inner circumference 208a defined by the first bore 208 and an outer perimeter or outer circumference 202a. A portion 202b of the outer circumference 202a of the first end 202 is coupled to or integrally formed with the body 206.

In this example, the second end 204 is also integrally formed with, one-piece or monolithic with the body 206. The second end 204 is substantially annular or disc-shaped, and has a thickness that is less than the thickness of the body 206. The reduced thickness of the second end 204 assists in coupling the second end 204 to the outer bypass duct 106. The second end 204 includes an outer portion 220, an inner portion 222 and a plurality of frangible members 224. The outer portion 220 defines an outer perimeter or outer circumference 204a of the second end 204. A portion 220a of the outer circumference 204a of the outer portion 220 is coupled to or integrally formed with the body 206. The outer portion 220 is coaxial with the inner portion 222, circumscribes the inner portion 222 and is spaced radially apart from the inner portion 222. The outer portion 220 has a thickness T1. The thickness T1 is less than a thickness T2 of the inner portion 222. The thickness T1 retains the outer portion 220 on the inner portion 222 when one or more of the frangible members 224 have broken or fractured. Thus, as will be discussed, when one or more of the frangible members 224 are broken or fractured, the outer portion 220 remains coupled to the outer bypass duct 106.

Figure 4:
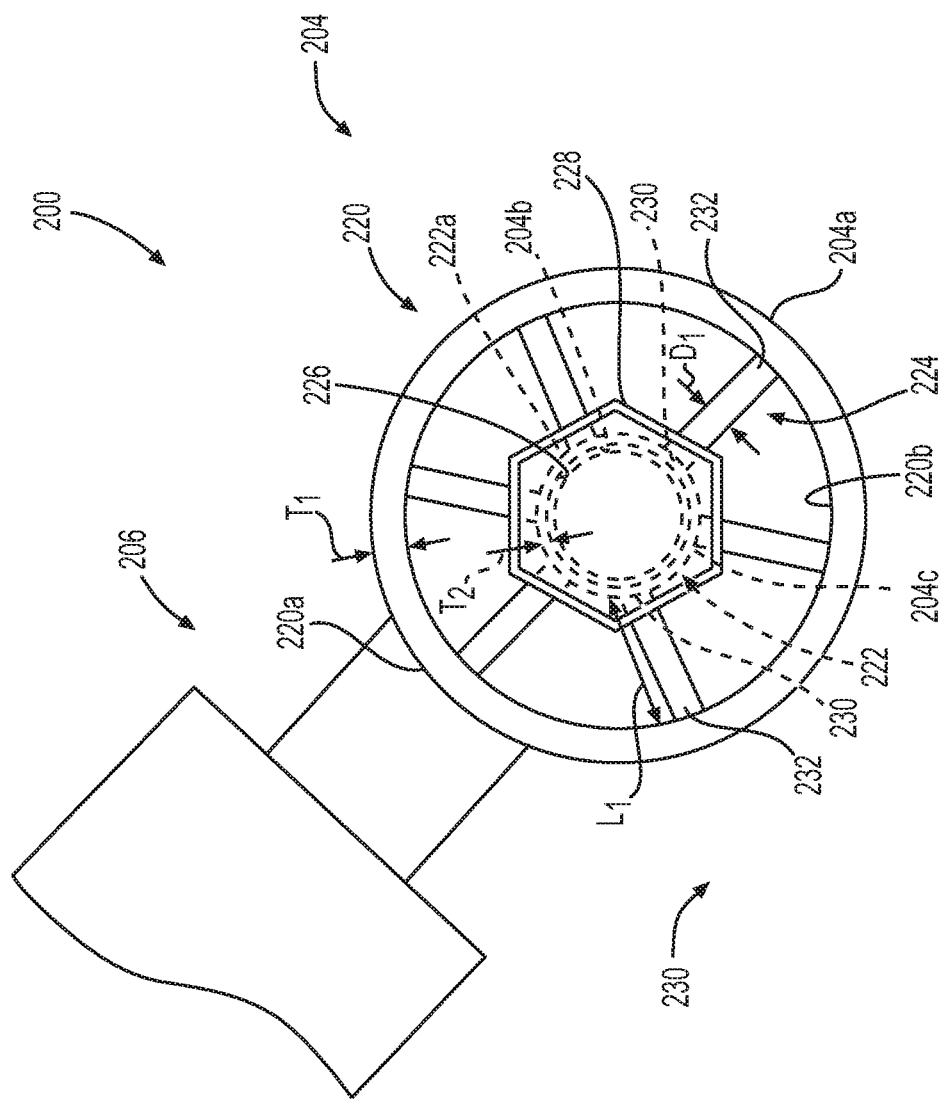
FIG. 4 is a detail front view of a second end of the frangible strut of FIG. 3, taken at detail 4 of FIG. 2, which illustrates a plurality of frangible members associated with the second end in a first, intact state.

The inner portion 222 is substantially annular, and defines both an inner perimeter or an inner circumference 204b of the second end 204, and an outer surface 222a of the inner portion 222 defines an intermediate perimeter or intermediate circumference 204c of the second end 204. The inner portion 222 defines a second bore 226. With reference to FIG. 4, the second bore 226 receives a fastening device, for example a mechanical fastener, such as a second bolt 228, for coupling the second end 204 to the respective mounting lug 128a of the outer casing 128 of the outer bypass duct 106 (FIG. 2). Thus, the inner portion 222 is configured to receive a fastening device, for example a mechanical fastener, such as the second bolt 228, to couple the second end 204 to the outer casing 128 of the outer bypass duct 106 (FIG. 2). It should be noted that the use of the second bolt 228 is merely exemplary, as any suitable mechanical fastener may be employed to couple the second end 204 to the outer bypass duct 106. The second bore 226 defines the inner perimeter or inner circumference 204b of the second end 204. The frangible members 224 space the inner portion 222 apart from the outer portion 220, which results in the second end 204 being substantially hollow between the inner circumference 226a and the outer circumference 204a.

The frangible members 224 interconnect the inner portion 222 and the outer portion 220, and are each integrally formed with the inner portion 222 and the outer portion 220. Generally, the frangible members 224 are spaced apart about the intermediate circumference 204c defined by the outer surface 222a of the inner portion 222, and extend from the outer surface 222a of the inner portion 222 to an inner surface 220b of the outer portion 220. It should be noted that while the second end 204 is illustrated herein as having six frangible members 224, the second end 204 may include any number of frangible members 224. In one example, each of the frangible members 224 comprises a solid spoke or cylinder, which extends radially between the inner portion 222 and the outer portion 220. Each of the frangible members 224 has a first member end 230 and an opposite second member end 232, with a length L1 defined between the first member end 230 and the second member end 232. The first member end 230 is coupled to or integrally formed with the inner portion 222, and the second member end 232 is coupled to or integrally formed with the outer portion 220. Each of the frangible members 224 also have a diameter D1, which is predefined to enable each of the frangible members 224 to break or fracture at a pre-determined threshold force.

Figure 5:
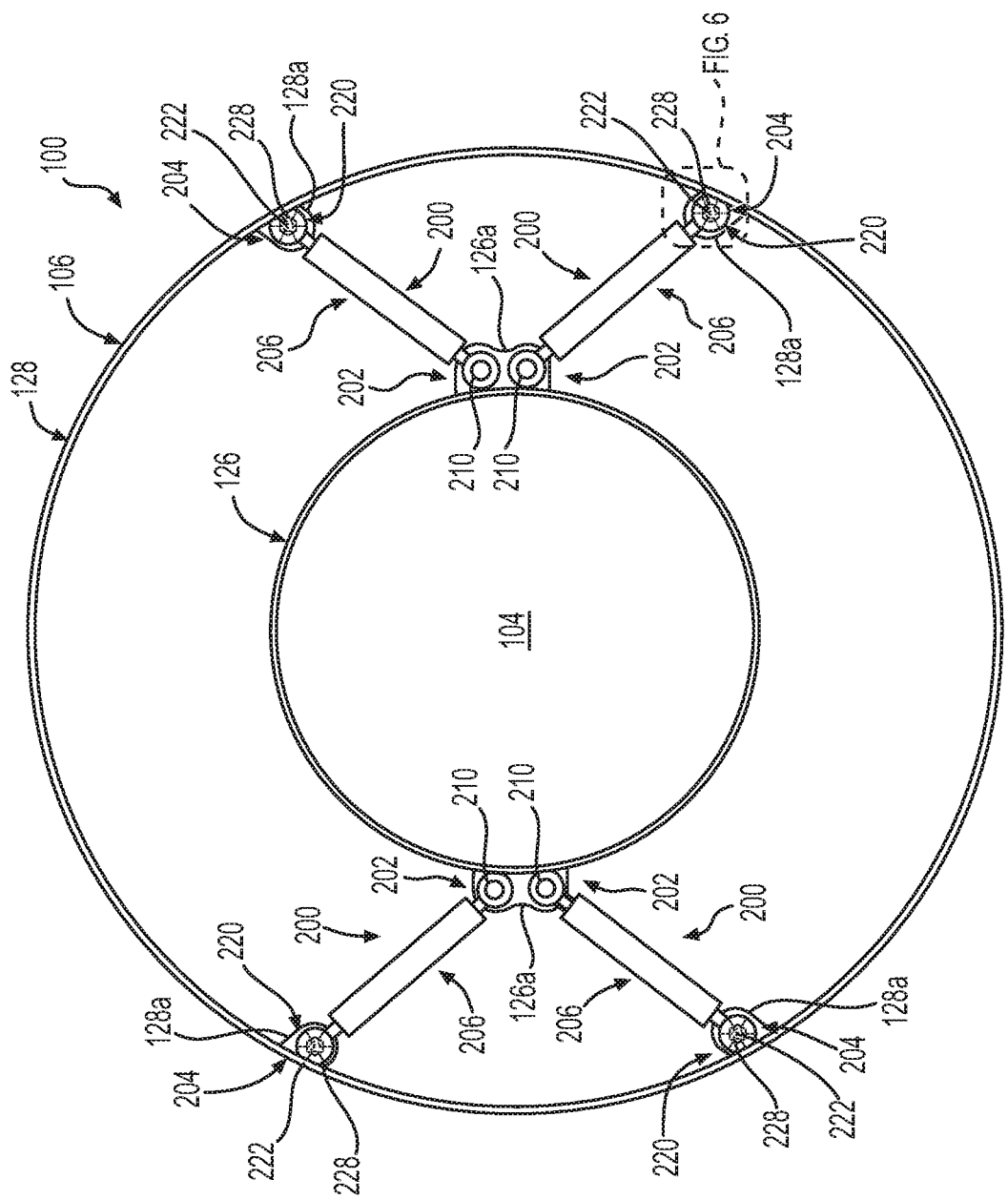
FIG. 5 is a schematic cross-sectional view of the gas turbine engine of FIG. 1, taken from the perspective of line 2-2 of FIG. 1 into the page, in which the gas turbine engine is in a second operating state and the plurality of frangible members associated with the second ends of the frangible struts are in a second, fractured state.

Generally, the frangible members 224 remain in a first, intact state during a first, normal operating state of the gas turbine engine 100 (FIG. 2), and the frangible members 224 are in a second, fractured state in which the frangible members 224 are broken during a second operating state of the gas turbine engine 100 (FIG. 5). The second operating state of the gas turbine engine 100 is an operating state other than a normal operating state in which an unexpected load is generated within the engine core 104, for example. In one example, each of the frangible members 224 may have the diameter D1 of about 0.15 inches (in.), and are each configured to break or fracture when subjected to a force greater than the pre-defined threshold force of approximately 6000 pounds-force (lbf) of tension or compression along the frangible strut 200. It should be noted that the pre-defined threshold force is merely an example, as the pre-defined threshold force may vary based on the size of the gas turbine engine 100 or the particular application for the frangible strut 200. As will be discussed, the breaking or fracturing of one or more of the frangible members 224 releases the inner portion 222 from the outer portion 220, which substantially removes a load path between the inner portion 222 and the outer portion 220, and reduces a load acting on the outer bypass duct 106.

With reference to FIG. 3, the body 206 interconnects the first end 202 and the second end 204. The body 206 includes a first body end 240, an opposite second body end 242 and a main body section 244. The first body end 240 includes a pair of opposed flat surfaces 246, which transition the body 206 to the first end 202. Generally, a terminal end 240a of the first body end 240 is integrally formed with or coupled to the portion 202b of the outer circumference 202a of the first end 202. The second body end 242 includes a second pair of opposed flat surfaces 248, which transition the body 206 to the second end 204. Generally, a terminal end 242a of the second body end 242 is integrally formed with or coupled to the portion 220a of the outer circumference 204a of the second end 204. The main body section 244 is cylindrical and interconnects the first body end 240 with the second body end 242. The main body section 244 is substantially solid; however, the main body section 244 may be hollow.

In one example, with each of the frangible struts 200 formed, with reference to FIG. 2, the first end 202 of each of the frangible struts 200 is coupled to the first structure or the mounting lug 126a of the exhaust guide vane 126 of the engine core 104 of the gas turbine engine 100 via the bolt 210. The second end 204 of each of the frangible struts 200 is coupled to the second structure or the mounting lug 128a of the outer casing 128 of the outer bypass duct 106 of the gas turbine engine 100 via the second bolt 228. With the frangible struts 200 coupled between the engine core 104 and the outer bypass duct 106 of the gas turbine engine 100, in the first, normal operating state of the gas turbine engine 100, the frangible struts 200 reduce rubbing and maintain clearances between rotating components within the engine core 104 and the static structure of the engine core 104, along with maintaining clearances between the engine core 104 and the outer bypass duct 106, which increases performance of the gas turbine engine 100. In the first, normal operating state of the gas turbine engine 100, the frangible members 224 are in the first, intact state. In the second operating state of the gas turbine engine 100 in which an unexpected load is generated within the engine core 104, for example, once the force applied to each of the second ends 204 of the frangible struts 200 exceeds the pre-defined threshold force, with reference to FIG. 5, the frangible members 224 of each of the second ends 204 fracture or break, releasing the outer portion 220 from the inner portion 222 of the respective frangible strut 200. The thickness T1 (FIG. 6) may maintain the outer portion 220 disposed about the inner portion 222 after the failure or fracture of the frangible members 224, which maintains the coupling of the outer bypass duct 106 to the exhaust guide vane 126 of the engine core 104 while reducing loads that are transferred to the outer bypass duct 106.

Figure 6:
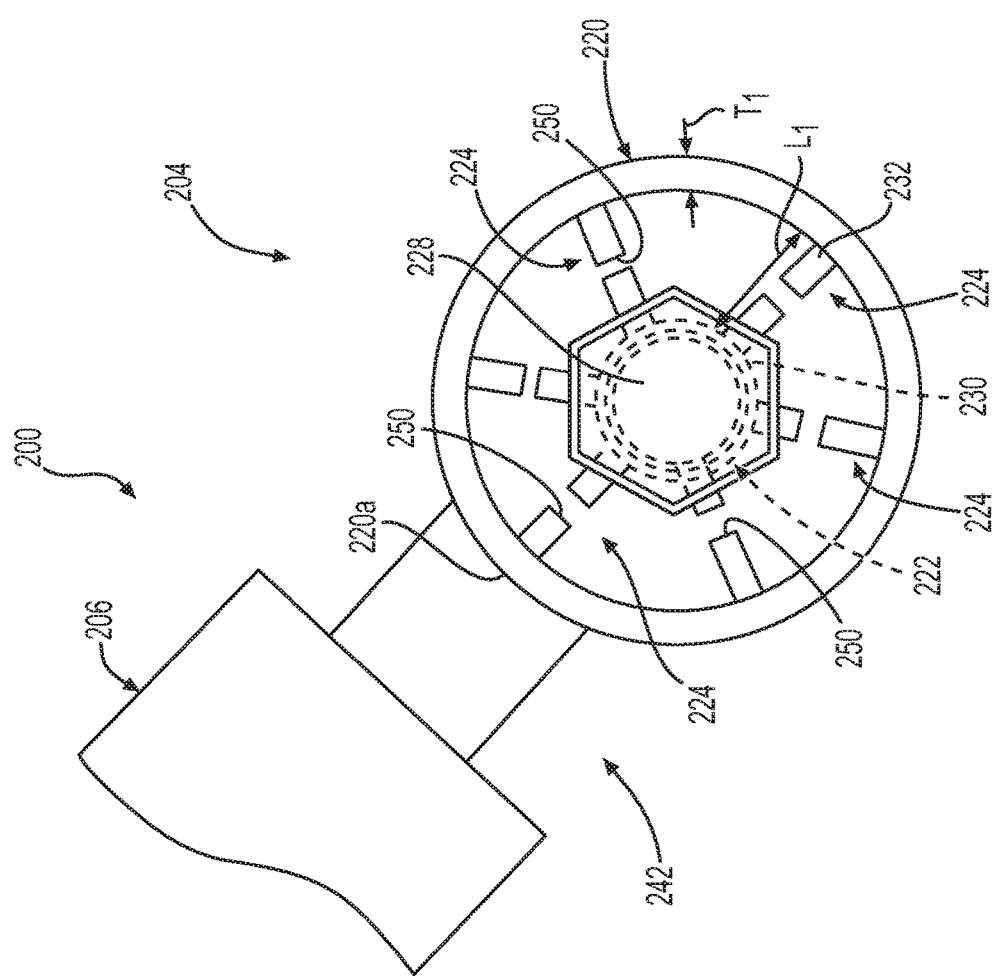
FIG. 6 is a detail front view of the second end of the frangible strut of FIG. 3, taken at detail 6 of FIG. 5, which illustrates the plurality of frangible members associated with the second end in the second, fractured state.

With reference to FIG. 6, a detail view of the second end 204 with the frangible members 224 in the second, fractured state is shown. In the second, fractured state, in this example, each of the frangible members 224 has fractured or broken at breaks 250, thereby releasing the outer portion 220 from the inner portion 222. It should be noted that the breaks 250 in the frangible members 224 shown in FIG. 6 are merely exemplary, as each of the frangible members 224 may fracture or break at any point along the length L1 of each of the frangible members 224. The release of the outer portion 220 from the inner portion 222 substantially removes a load path between the engine core 104 (FIG. 5) and the outer bypass duct 106 (FIG. 5), and also reduces forces acting on the outer bypass duct 106 (FIG. 5).

Figure 7:
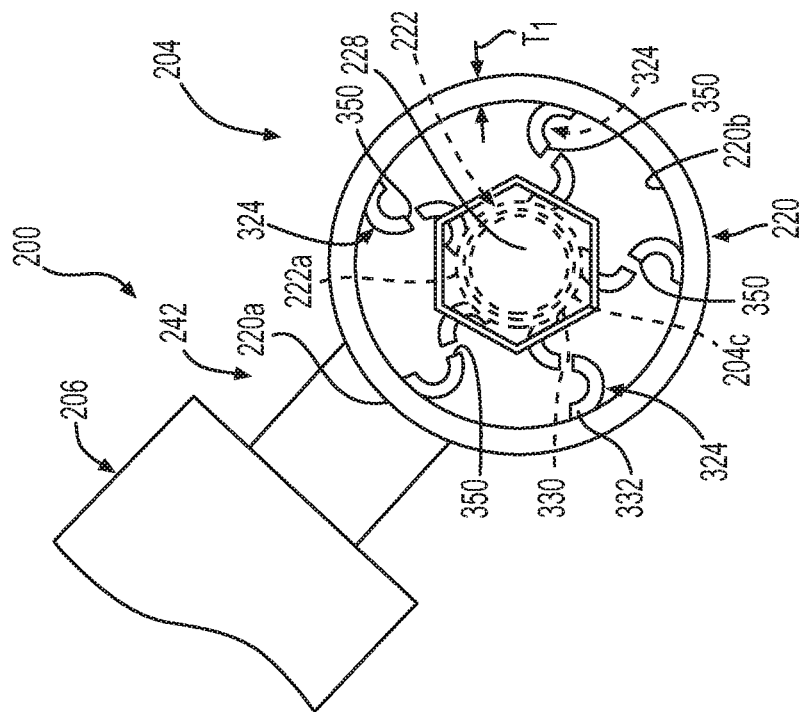
FIG. 7 is a detail front view of a second end for the frangible strut of the gas turbine engine, taken from the perspective of detail 4 of FIG. 2, which illustrates another exemplary plurality of frangible members associated with the second end in a first, intact state.

It should be noted that in other embodiments, the frangible members 224 may be configured differently to release the outer portion 220 from the inner portion 222 during the second operating state of the gas turbine engine 100. With reference to FIG. 7, a plurality of frangible members 324 for use with the second end 204 of the frangible strut 200 are shown. The frangible members 324 interconnect the inner portion 222 and the outer portion 220, and are each integrally formed with the inner portion 222 and the outer portion 220. Generally, the frangible members 324 are spaced apart about the intermediate circumference 204c defined by the outer surface 222a of the inner portion 222, and extend from the outer surface 222a of the inner portion 222 to the inner surface 220b of the outer portion 220. It should be noted that while the second end 204 is illustrated herein as having five frangible members 324, the second end 204 may include any number of frangible members 324. In one example, each of the frangible members 324 comprises a solid S-shaped body, which extends radially between the inner portion 222 and the outer portion 220. Thus, in this example, each of the frangible members 324 is curved. Each of the frangible members 324 has a first member end 330 and an opposite second member end 332, with an overall length L2 defined between the first member end 330 and the second member end 332. The first member end 330 is coupled to or integrally formed with the inner portion 222, and the second member end 332 is coupled to or integrally formed with the outer portion 220. Each of the frangible members 324 also have a thickness T3, which is predefined to enable each of the frangible members 324 to break or fracture at a pre-determined threshold force.

Figure 8:
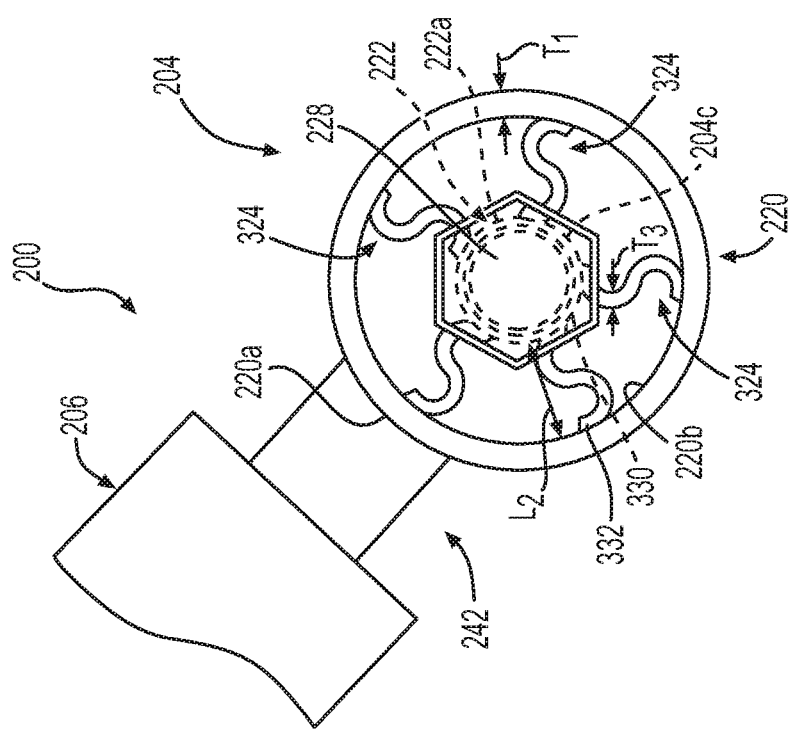
FIG. 8 is a detail front view of the second end of the frangible strut of FIG. 7, taken from the perspective of detail 6 of FIG. 5, which illustrates the plurality of frangible members associated with the second end of FIG. 7 in the second, fractured state.

Generally, the frangible members 324 remain in a first, intact state during the first, normal operating state of the gas turbine engine 100 (FIG. 2), and the frangible members 324 are in a second, fractured state in which the frangible members 324 are broken during the second operating state of the gas turbine engine 100 (FIG. 8). For example, each of the frangible members 324 may have the thickness T3 of about 0.1 inches (in.), and are each configured to break or fracture when subjected to a force greater than the pre-defined threshold force of approximately 6000 pounds-force (lbf) of tension or compression along the frangible strut 200. It should be noted that the pre-defined threshold force is merely an example, as the pre-defined threshold force may vary based on the size of the gas turbine engine 100 or the particular application for the frangible strut 200. The breaking or fracturing of one or more of the frangible members 324 releases the inner portion 222 from the outer portion 220, which substantially removes a load path between the engine core 104 (FIG. 5) and the outer bypass duct 106 (FIG. 5), and reduces a load acting on the outer bypass duct 106 (FIG. 5).

In one example, with each of the frangible struts 200 formed with the second end 204 including the plurality of frangible members 324, the first end 202 of each of the frangible struts 200 is coupled to the first structure or the mounting lugs 126a of the exhaust guide vane 126 of the engine core 104 of the gas turbine engine 100 via the bolt 210 (FIG. 2). The second end 204 of each of the frangible struts 200 is coupled to the second structure or the mounting lugs 128a of the outer casing 128 of the outer bypass duct 106 of the gas turbine engine 100 via the second bolt 228. With the frangible struts 200 coupled between the engine core 104 and the outer bypass duct 106 of the gas turbine engine 100 (FIG. 2), in the first, normal operating state of the gas turbine engine 100, the frangible struts 200 reduce rubbing and maintain clearances between rotating components within the engine core 104 and the static structure of the engine core 104, along with maintaining clearances between the engine core 104 and the outer bypass duct 106 (FIG. 2), which increases performance of the gas turbine engine 100. In the first, normal operating state of the gas turbine engine 100, the frangible members 324 are in the first, intact state. In the second operating state of the gas turbine engine 100 in which an unexpected load is generated within the engine core 104, for example, once the force applied to each of the second ends 204 of the frangible struts 200 exceeds the pre-defined threshold force, the frangible members 324 of each of the second ends 204 fracture or break, releasing the outer portion 220 from the inner portion 222 of the respective frangible strut 200. With reference to FIG. 8, a detail view of the second end 204 with the frangible members 324 in the second, fractured state is shown. In the second, fractured state, in this example, each of the frangible members 324 has fractured or broken at breaks 350, thereby releasing the outer portion 220 from the inner portion 222. It should be noted that the breaks 350 in the frangible members 324 shown in FIG. 8 are merely exemplary, as each of the frangible members 324 may fracture or break at any point along the length L3 of each of the frangible members 324. The release of the outer portion 220 from the inner portion 222 substantially removes a load path between the engine core 104 (FIG. 5) and the outer bypass duct 106 (FIG. 5), and also reduces forces acting on the outer bypass duct 106 (FIG. 5). As discussed previously, thickness T1 of the outer portion 220 may maintain the outer portion 220 disposed about the inner portion 222 after the failure or fracture of the frangible members 324, which maintains the coupling of the outer bypass duct 106 to the engine core 104 while reducing loads that are transferred to the outer bypass duct 106.

Figure 9:
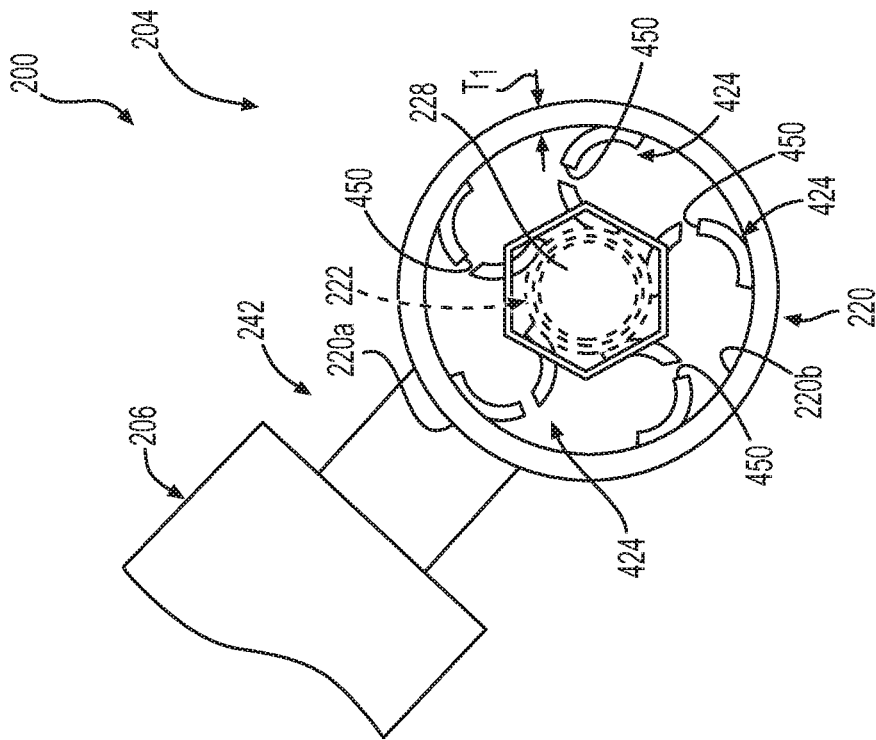
FIG. 9 is a detail front view of a second end for the frangible strut of the gas turbine engine, taken from the perspective of detail 4 of FIG. 2, which illustrates yet another exemplary plurality of frangible members associated with the second end in a first, intact state.

It should be noted that in other embodiments, the frangible members 224 may be configured differently to release the outer portion 220 from the inner portion 222 during the second operating state of the gas turbine engine 100. With reference to FIG. 9, a plurality of frangible members 424 for use with the second end 204 of the frangible strut 200 are shown. The frangible members 424 interconnect the inner portion 222 and the outer portion 220, and are each integrally formed with the inner portion 222 and the outer portion 220. Generally, the frangible members 424 are spaced apart about the intermediate circumference 204c defined by the outer surface 222a of the inner portion 222, and extend from the outer surface 222a of the inner portion 222 to the inner surface 220b of the outer portion 220. It should be noted that while the second end 204 is illustrated herein as having five frangible members 424, the second end 204 may include any number of frangible members 424. In one example, each of the frangible members 424 comprises a solid C-shaped body, which extends radially between the inner portion 222 and the outer portion 220. Thus, in this example, each of the frangible members 424 is curved. Each of the frangible members 424 has a first member end 430 and an opposite second member end 432, with a diameter D4 defined between the first member end 430 and the second member end 432. The first member end 430 is coupled to or integrally formed with the inner portion 222, and the second member end 432 is coupled to or integrally formed with the outer portion 220. Each of the frangible members 424 also have a thickness T4, which is predefined to enable each of the frangible members 424 to break or fracture at a predetermined threshold force.

Figure 10:
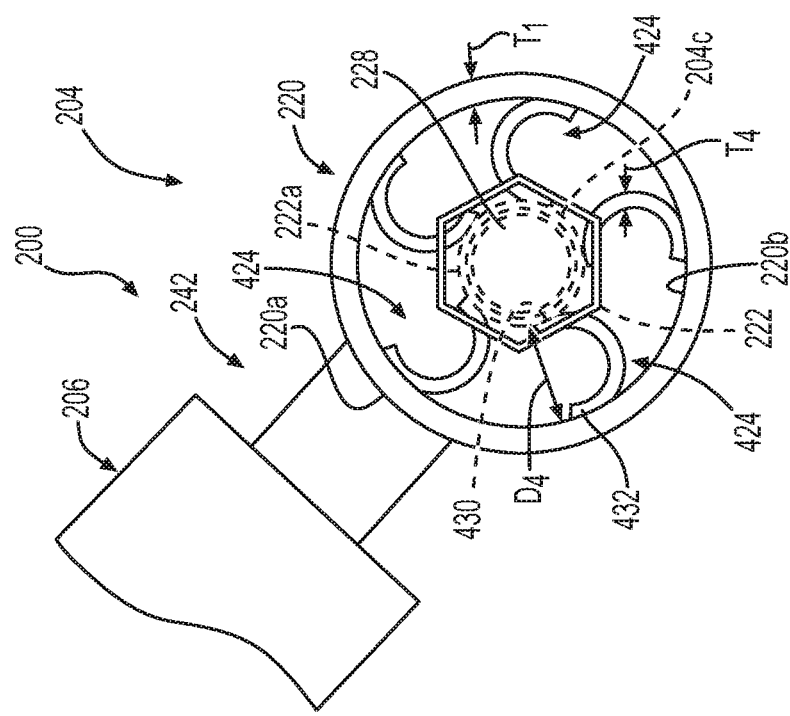
FIG. 10 is a detail front view of the second end of the frangible strut of FIG. 9, taken from the perspective of detail 6 of FIG. 5, which illustrates the plurality of frangible members associated with the second end of FIG. 9 in the second, fractured state.

Generally, the frangible members 424 remain in a first, intact state during the first, normal operating state of the gas turbine engine 100 (FIG. 2), and the frangible members 424 are in a second, fractured state in which the frangible members 424 are broken during the second operating state of the gas turbine engine 100 (FIG. 10). For example, each of the frangible members 424 may have the thickness T4 of about 0.1 inches (in.), and are each configured to break or fracture when subjected to a force greater than the pre-defined threshold force of approximately 6000 pounds-force (lbf) of tension or compression along the frangible strut 200. It should be noted that the pre-defined threshold force is merely an example, as the pre-defined threshold force may vary based on the size of the gas turbine engine 100 or the particular application for the frangible strut 200. The breaking or fracturing of one or more of the frangible members 424 releases the inner portion 222 from the outer portion 220, which substantially removes a load path between the engine core 104 (FIG. 5) and the outer bypass duct 106 (FIG. 5), and reduces a load acting on the outer bypass duct 106 (FIG. 5).

In one example, with each of the frangible struts 200 formed with the second end 204 including the plurality of frangible members 424, the first end 202 of each of the frangible struts 200 is coupled to the first structure or the mounting lugs 126a of the exhaust guide vane 126 of the engine core 104 of the gas turbine engine 100 via the bolt 210 (FIG. 2). The second end 204 of each of the frangible struts 200 is coupled to the second structure or the mounting lugs 128a of the outer casing 128 of the outer bypass duct 106 of the gas turbine engine 100 via the second bolt 228. With the frangible struts 200 coupled between the engine core 104 and the outer bypass duct 106 of the gas turbine engine 100 (FIG. 2), in the first, normal operating state of the gas turbine engine 100, the frangible struts 200 reduce rubbing and maintain clearances between rotating components within the engine core 104 and the static structure of the engine core 104, along with maintaining clearances between the engine core 104 and the outer bypass duct 106 (FIG. 2), which increases performance of the gas turbine engine 100. In the first, normal operating state of the gas turbine engine 100, the frangible members 424 are in the first, intact state. In the second operating state of the gas turbine engine 100 in which an unexpected load is generated within the engine core 104, for example, once the force applied to each of the second ends 204 of the frangible struts 200 exceeds the pre-defined threshold force, the frangible members 424 of each of the second ends 204 fracture or break, releasing the outer portion 220 from the inner portion 222 of the respective frangible strut 200. With reference to FIG. 10, a detail view of the second end 204 with the frangible members 424 in the second, fractured state is shown. In the second, fractured state, in this example, each of the frangible members 424 has fractured or broken at breaks 450, thereby releasing the outer portion 220 from the inner portion 222. It should be noted that the breaks 450 in the frangible members 424 shown in FIG. 10 are merely exemplary, as each of the frangible members 424 may fracture or break at any point between the first member end 430 and the second member end 432 of each of the frangible members 424. The release of the outer portion 220 from the inner portion 222 substantially removes a load path between the engine core 104 (FIG. 5) and the outer bypass duct 106 (FIG. 5), and also reduces forces acting on the outer bypass duct 106 (FIG. 5). As discussed previously, thickness T1 of the outer portion 220 may maintain the outer portion 220 disposed about the inner portion 222 after the failure or fracture of the frangible members 424, which maintains the coupling of the outer bypass duct 106 to the engine core 104 while reducing loads that are transferred to the outer bypass duct 106.

Figure 11:
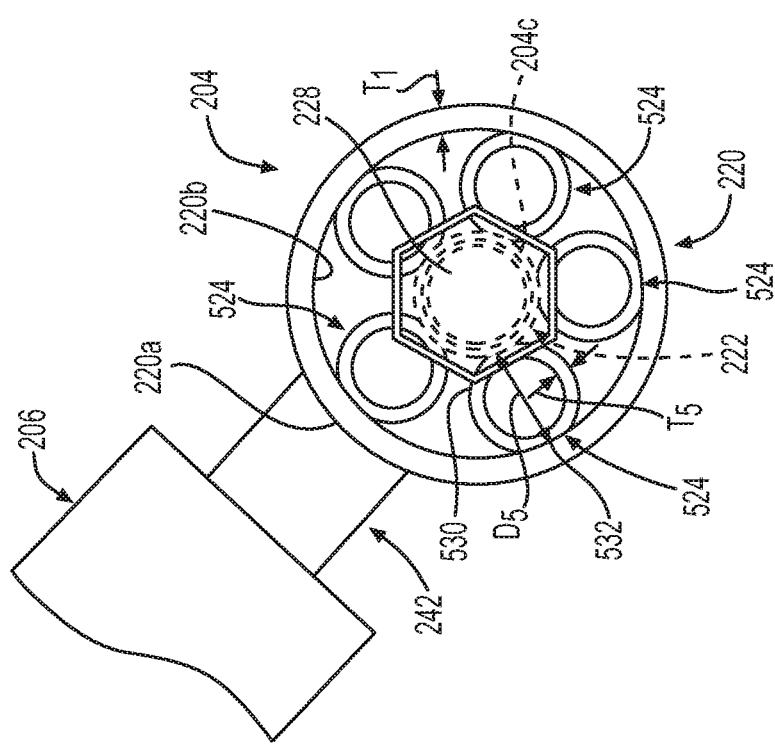
FIG. 11 is a detail front view of a second end for the frangible strut of the gas turbine engine, taken from the perspective of detail 4 of FIG. 2, which illustrates a further exemplary plurality of frangible members associated with the second end in a first, intact state.

It should be noted that in other embodiments, the frangible members 224 may be configured differently to release the outer portion 220 from the inner portion 222 during the second operating state of the gas turbine engine 100. With reference to FIG. 11, a plurality of frangible members 524 for use with the second end 204 of the frangible strut 200 are shown. The frangible members 524 interconnect the inner portion 222 and the outer portion 220, and are each integrally formed with the inner portion 222 and the outer portion 220. Generally, the frangible members 524 are spaced apart about the intermediate circumference 204c defined by the outer surface 222a of the inner portion 222, and extend from the outer surface 222a of the inner portion 222 to the inner surface 220b of the outer portion 220. It should be noted that while the second end 204 is illustrated herein as having five frangible members 524, the second end 204 may include any number of frangible members 524. In one example, each of the frangible members 524 comprises a ring, which is defined radially between the inner portion 222 and the outer portion 220. Each of the frangible members 524 has a first member end 530 and an opposite second member end 532, with a diameter D5 defined between the first member end 530 and the second member end 532. The first member end 530 is coupled to or integrally formed with the inner portion 222, and the second member end 532 is coupled to or integrally formed with the outer portion 220. Each of the frangible members 524 also have a thickness T5, which is predefined to enable each of the frangible members 524 to break or fracture at a pre-determined threshold force.

Figure 12:
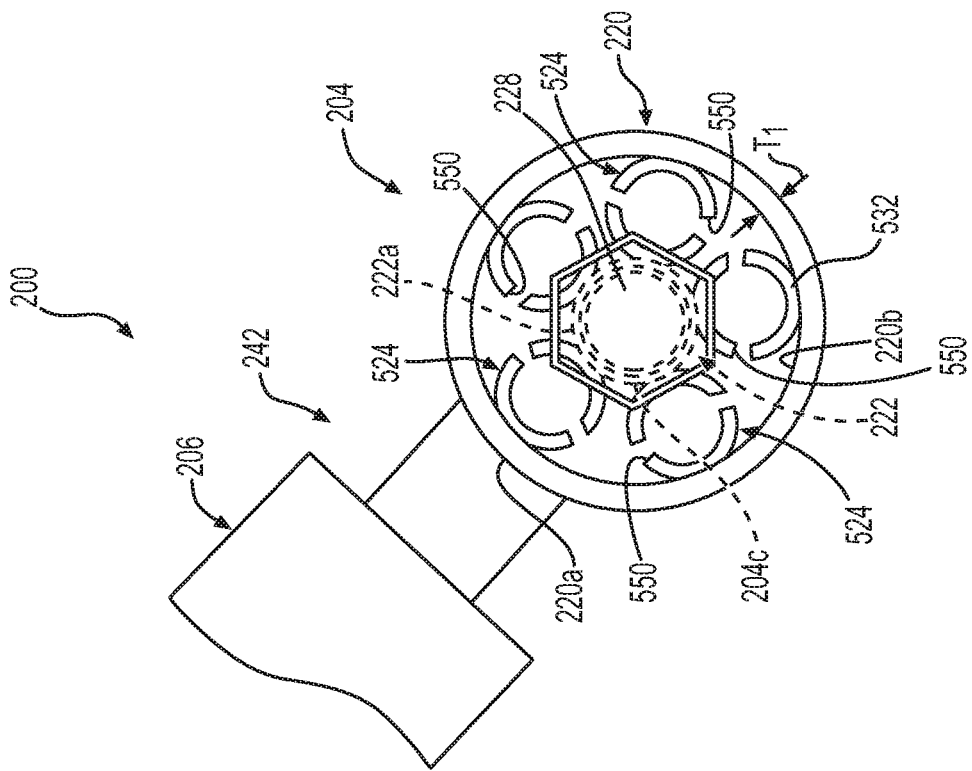
FIG. 12 is a detail front view of the second end of the frangible strut of FIG. 11, taken from the perspective of detail 6 of FIG. 5, which illustrates the plurality of frangible members associated with the second end of FIG. 11 in the second, fractured state.

Generally, the frangible members 524 remain in a first, intact state during the first, normal operating state of the gas turbine engine 100 (FIG. 2), and the frangible members 524 are in a second, fractured state in which the frangible members 524 are broken during the second operating state of the gas turbine engine 100 (FIG. 12). For example, each of the frangible members 524 may have the thickness T5 of about 0.1 inches (in.), and are each configured to break or fracture when subjected to a force greater than the pre-defined threshold force of approximately 6000 pounds-force (lbf) of tension or compression along the frangible strut 200. It should be noted that the pre-defined threshold force is merely an example, as the pre-defined threshold force may vary based on the size of the gas turbine engine 100 or the particular application for the frangible strut 200. The breaking or fracturing of one or more of the frangible members 524 releases the inner portion 222 from the outer portion 220, which substantially removes a load path between the engine core 104 (FIG. 5) and the outer bypass duct 106 (FIG. 5), and reduces a load acting on the outer bypass duct 106 (FIG. 5).

In one example, with each of the frangible struts 200 formed with the second end 204 including the plurality of frangible members 524, the first end 202 of each of the frangible struts 200 is coupled to the first structure or the mounting lugs 126a of the exhaust guide vane 126 of the engine core 104 of the gas turbine engine 100 via the bolt 210 (FIG. 2). The second end 204 of each of the frangible struts 200 is coupled to the second structure or the mounting lugs 128a of the outer casing 128 of the outer bypass duct 106 of the gas turbine engine 100 via the second bolt 228. With the frangible struts 200 coupled between the engine core 104 and the outer bypass duct 106 of the gas turbine engine 100 (FIG. 2), in the first, normal operating state of the gas turbine engine 100, the frangible struts 200 reduce rubbing and maintain clearances between rotating components within the engine core 104 and the static structure of the engine core 104, along with maintaining clearances between the engine core 104 and the outer bypass duct 106 (FIG. 2), which increases performance of the gas turbine engine 100. In the first, normal operating state of the gas turbine engine 100, the frangible members 524 are in the first, intact state. In the second operating state of the gas turbine engine 100 in which an unexpected load is generated within the engine core 104, for example, once the force applied to each of the second ends 204 of the frangible struts 200 exceeds the pre-defined threshold force, the frangible members 524 of each of the second ends 204 fracture or break, releasing the outer portion 220 from the inner portion 222 of the respective frangible strut 200. With reference to FIG. 10, a detail view of the second end 204 with the frangible members 524 in the second, fractured state is shown. In the second, fractured state, in this example, each of the frangible members 524 has fractured or broken at breaks 550, thereby releasing the outer portion 220 from the inner portion 222. It should be noted that the breaks 550 in the frangible members 524 shown in FIG. 12 are merely exemplary, as each of the frangible members 524 may fracture or break at any point about the circumference of each of the frangible members 524. The release of the outer portion 220 from the inner portion 222 substantially removes a load path between the engine core 104 (FIG. 5) and the outer bypass duct 106 (FIG. 5), and also reduces forces acting on the outer bypass duct 106 (FIG. 5). As discussed previously, thickness T1 of the outer portion 220 may maintain the outer portion 220 disposed about the inner portion 222 after the failure or fracture of the frangible members 524, which maintains the coupling of the outer bypass duct 106 to the engine core 104 while reducing loads that are transferred to the outer bypass duct 106.

Figure 13:
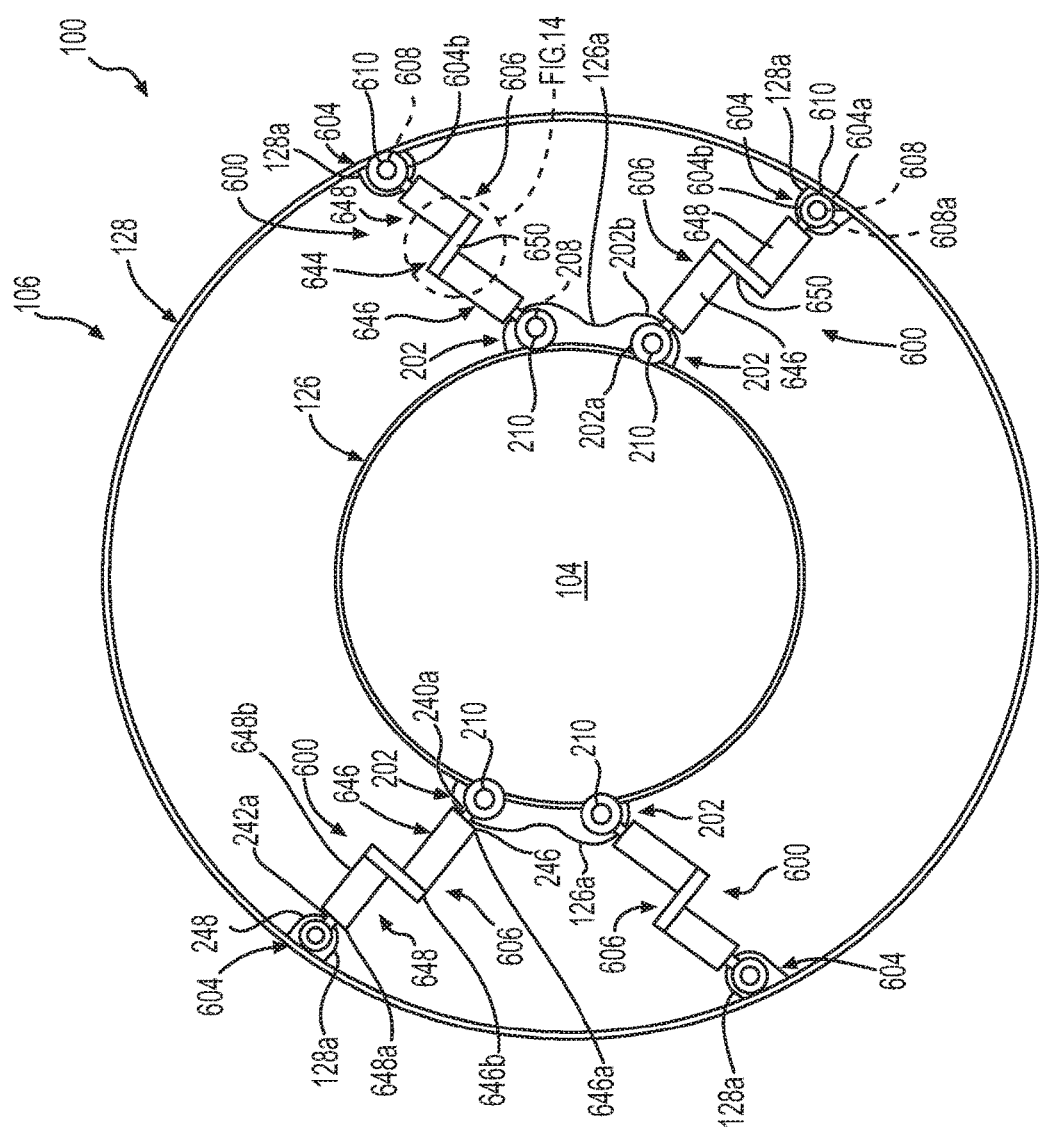
FIG. 13 is a schematic cross-sectional view of the gas turbine engine of FIG. 1, taken from the perspective of line 2-2 of FIG. 1 into the page, in which another exemplary plurality of the frangible struts having a body with an exemplary frangible portion are coupled between the first structure of the gas turbine engine and the second structure of the gas turbine engine, and the gas turbine engine is in a first operating state.

It should be noted that in other embodiments, the frangible strut 200 may be configured differently to substantially remove the load path between the engine core 104 and the outer bypass duct 106 (FIG. 1) during the second operating state of the gas turbine engine 100. In one example, with reference to FIG. 13, a cross-sectional schematic front view of a portion of the gas turbine engine 100 is shown. In the example of FIG. 13, four frangible struts 600 are employed to couple or connect the exhaust guide vane 126 of the engine core 104 with the outer bypass duct 106. It should be noted that the location of the frangible struts 600 in FIG. 13 is merely exemplary, as the frangible struts 600 may be positioned at any desired location to couple the engine core 104 to the outer bypass duct 106. Moreover, the number of frangible struts 600 is merely exemplary, as any number of frangible struts 600 may be employed depending upon the size of the engine core 104, for example. In this example, each of the frangible struts 600 is coupled to the exhaust guide vane 126, which surrounds and is coupled to the engine core 104, and the outer casing 128 of the outer bypass duct 106. Each of the frangible struts 600 have the first end 202 and an opposite second end 604, with a body 606 interconnecting the first end 202 and the second end 604. The first end 202 is coupled to the first structure of the gas turbine engine 100, which in this example is a respective one of the mounting lugs 126a of the exhaust guide vane 126 of the engine core 104, and the second end 604 is coupled to the second structure of the gas turbine engine 100, which in this example, is a respective one of the mounting lugs 128a of the outer casing 128 of the outer bypass duct 106. As each of the frangible struts 600 is the same, only one of the frangible struts 600 will be described in detail herein for ease of description.

The frangible strut 600 is composed of a metal or metal alloy, including, but not limited to steel, nickel alloy, aluminum and titanium. In other embodiments, the frangible strut 600 may be composed of a polymer-based material, including, but not limited to Para-aramids, Polyamide 11 & 12, and copolyamide. In one example, the frangible strut 600 is an integral component, and is formed through any suitable process, including, but not limited to, forging, casting, direct metal laser sintering (DMLS), laser powder bed fusion (L-PBF), electron powder bed fusion (E-PBF), electron beam melting (EBM), etc. In this example, the first end 202 and the second end 604 are each integrally formed with, one-piece or monolithic with the body 606. The portion 202b of the outer circumference 202a of the first end 202 is coupled to or integrally formed with the body 606. In this example, the first end 202 and the second end 604 are substantially the same. Thus, the second end 604 is substantially annular or disc-shaped, and has a thickness that is less than a thickness of the body 606. The reduced thickness of the second end 604 assists in coupling the second end 604 to outer casing 128 of the outer bypass duct 106. The second end 604 defines a second bore 608. The second bore 608 receives a fastening device, for example, a mechanical fastener, such as a second bolt 610, for coupling the second end 604 to a respective one of the mounting lugs 128a of the outer casing 128 of the outer bypass duct 106. It should be noted that the use of the second bolt 610 is merely exemplary, as any suitable mechanical fastener may be employed to couple the second end 604 to the outer bypass duct 106. The second end 604 is generally solid between an inner perimeter or inner circumference 608a defined by the second bore 608 and an outer perimeter or outer circumference 604a. A portion 604b of the outer circumference 604a of the second end 604 is coupled to or integrally formed with the body 606.

The body 606 interconnects the first end 202 and the second end 604. The body 606 includes the first body end 240, the opposite second body end 242 and a main body section 644. The first body end 240 includes the pair of opposed flat surfaces 246, which transition the body 606 to the first end 202. The second body end 242 includes the second pair of opposed flat surfaces 248, which transition the body 206 to the second end 604. The main body section 644 of the body 606 includes a first main body portion 646, a second main body portion 648 and a frangible portion 650 defined between the first main body portion 646 and the second main body portion 648. The first main body portion 646 is substantially cylindrical, and is substantially solid. The first main body portion 646 is defined between and coupled to the first body end 240 and the frangible portion 650. The first main body portion 646 has a first end 646a coupled to or integrally formed with the first body end 240, and an opposite second end 646b coupled to or integrally formed with the frangible portion 650. The second main body portion 648 is substantially cylindrical, and is substantially solid. The second main body portion 648 is defined between and coupled to the second body end 242 and the frangible portion 650. The second main body portion 648 has a first end 648a coupled to or integrally formed with the second body end 242, and an opposite second end 648b coupled to or integrally formed with the frangible portion 650.

Figure 14:
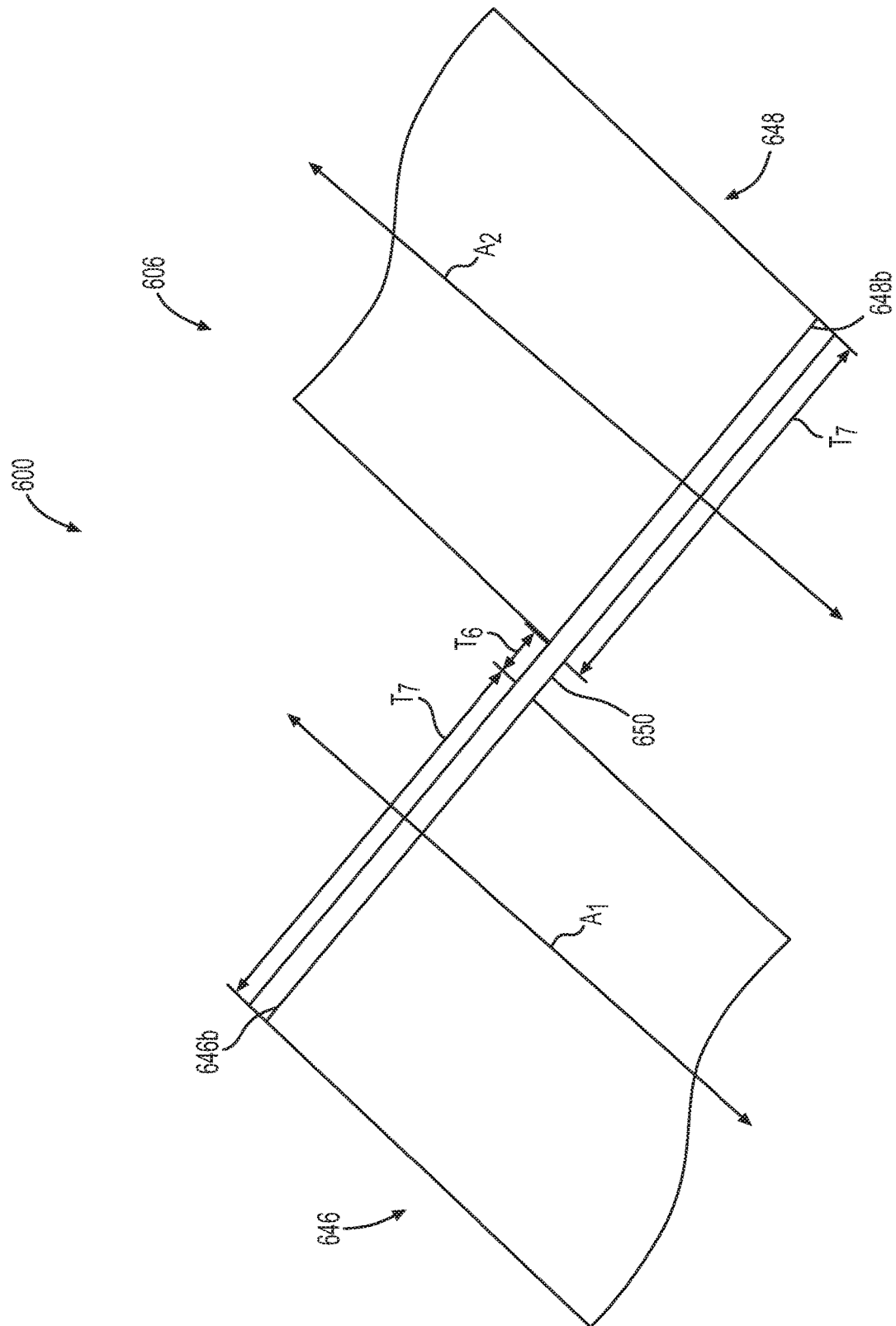
FIG. 14 is a detail front view of the body for the frangible strut of the gas turbine engine, taken at detail 14 of FIG. 13, which illustrates the exemplary frangible portion associated with the frangible strut of FIG. 13 in a first, intact state.

The frangible portion 650 interconnects the first main body portion 646 and the second main body portion 648. The frangible portion 650 is integrally formed with the first main body portion 646 and the second main body portion 648. With reference to FIG. 14, the frangible portion 650 is shown in greater detail. In this example, the first main body portion 646 extends along a first axis A1, and the second main body portion 648 extends along a second axis A2. The first axis A1 is different than and substantially parallel to the second axis A2, and thus, the second end 646b of the first main body portion 646 is offset from the second end 648b of the second main body portion 648. The frangible portion 650 is defined between the second end 646b of the first main body portion 646 and the second end 648b of the second main body portion 648 to interconnect the second ends 646b, 648b. In this example, the frangible portion 650 comprises a bar that extends between the second end 646b of the first main body portion 646 and the second end 648b of the second main body portion 648; however, the frangible portion 650 may have any desired shape. The frangible portion 650 has a thickness T6, which is less than a thickness T7 of each of the second ends 646b, 648b. The thickness T6 is predefined to enable the frangible portion 650 to break or fracture at a pre-determined threshold force.

Figure 15:
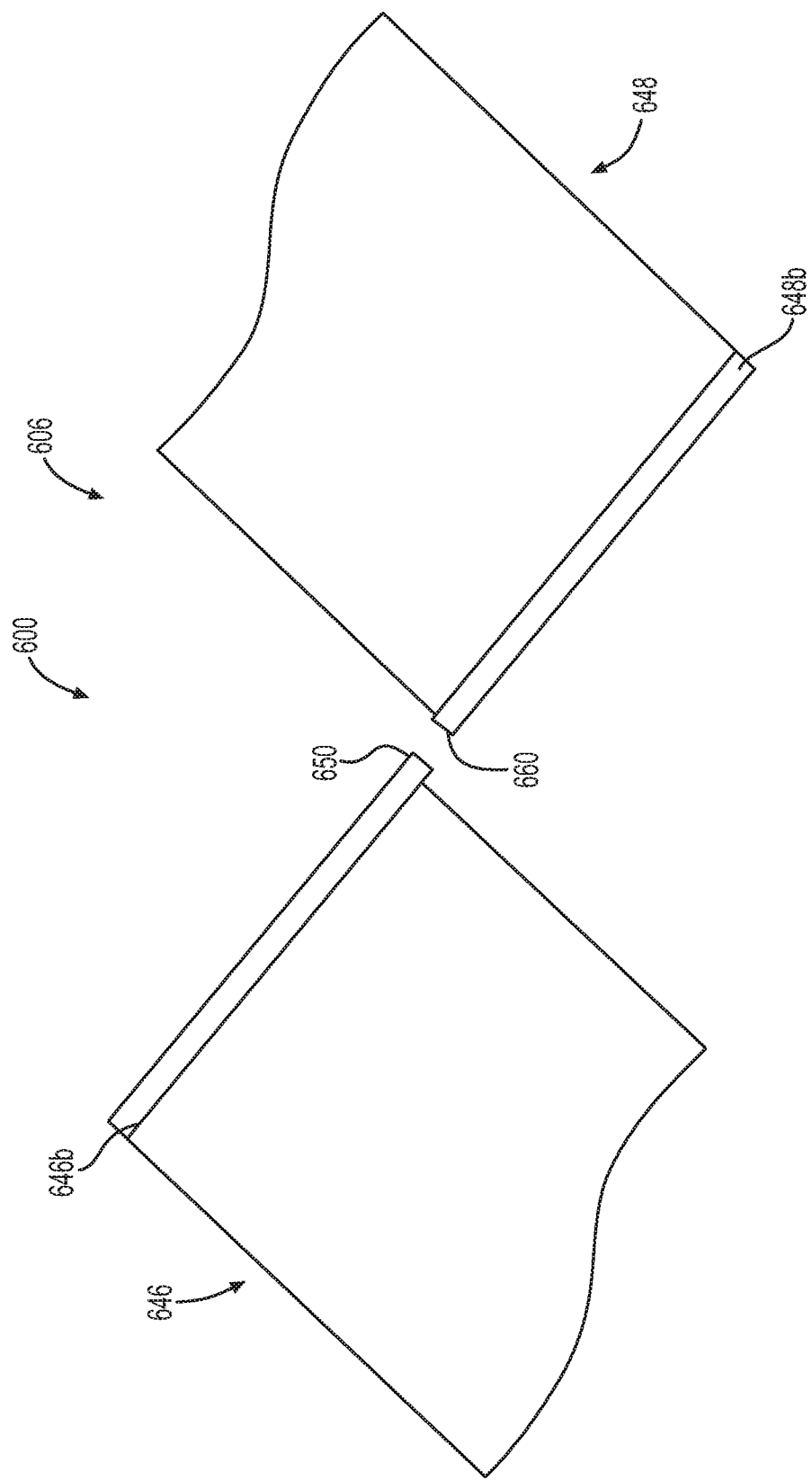
FIG. 15 is a detail front view of the body of the frangible strut of FIG. 14, taken from the perspective of detail 14 of FIG. 13, which illustrates the frangible portion associated with the frangible strut of FIG. 13 in the second, fractured state.

Generally, the frangible portion 650 remains in a first, intact state during a first, normal operating state of the gas turbine engine 100 (FIG. 13), and the frangible portion 650 is in a second, fractured state in which the frangible portion 650 is broken during the second operating state of the gas turbine engine 100 (FIG. 15). For example, the frangible portion 650 may have the thickness T6 of about 0.25 inches (in.), and is configured to break or fracture when subjected to a force greater than the pre-defined threshold force of approximately 6000 pounds-force (lbf) of tension or compression along the frangible strut 600. It should be noted that the pre-defined threshold force is merely an example, as the pre-defined threshold force may vary based on the size of the gas turbine engine 100 or the particular application for the frangible strut 600. As will be discussed, with reference to FIG. 13, the breaking or fracturing of the frangible portion 650 releases the first main body portion 646 from the second main body portion 648, which substantially removes a load path between the engine core 104 and the outer bypass duct 106, and reduces a load acting on the outer bypass duct 106.

In one example, with each of the frangible struts 600 formed, the first end 202 of each of the frangible struts 600 is coupled to the first structure or the mounting lugs 126a of the exhaust guide vane 126 of the engine core 104 of the gas turbine engine 100 via the bolt 210. The second end 604 of each of the frangible struts 600 is coupled to the second structure or the mounting lugs 128a of the outer casing 128 of the outer bypass duct 106 of the gas turbine engine 100 via the second bolt 610. With the frangible struts 600 coupled between the engine core 104 and the outer bypass duct 106 of the gas turbine engine 100, in the first, normal operating state of the gas turbine engine 100, the frangible struts 600 reduce rubbing and maintain clearances between rotating components within the engine core 104 and the static structure of the engine core 104, along with maintaining clearances between the engine core 104 and the outer bypass duct 106, which increases performance of the gas turbine engine 100. In the first, normal operating state of the gas turbine engine 100, the frangible portion 650 is in the first, intact state. In the second operating state of the gas turbine engine 100 in which an unexpected load is generated within the engine core 104, for example, once the force applied to the frangible struts 600 exceeds the pre-defined threshold force associated with the frangible portion 650, with reference to FIG. 15, the frangible portion 650 fractures or breaks, releasing the first main body portion 646 from the second main body portion 648 of the respective frangible strut 600.

FIG. 15 is a detail view of the body 606 with the frangible portion 650 in the second, fractured state. In the second, fractured state, in this example, the frangible portion 650 has fractured or broken at break 660, thereby releasing the first main body portion 646 from the second main body portion 648. It should be noted that the break 660 in the frangible portion 650 shown in FIG. 15 is merely exemplary, as the frangible portion 650 may fracture or break at any point along the frangible portion 650 between the second end 646b of the first main body portion 646 and the second end 648b of the second main body portion 648. The release of the first main body portion 646 from the second main body portion 648 substantially removes a load path between the engine core 104 (FIG. 13) and the outer bypass duct 106 (FIG. 13), and also reduces forces acting on the outer bypass duct 106 (FIG. 13).

Figure 16:
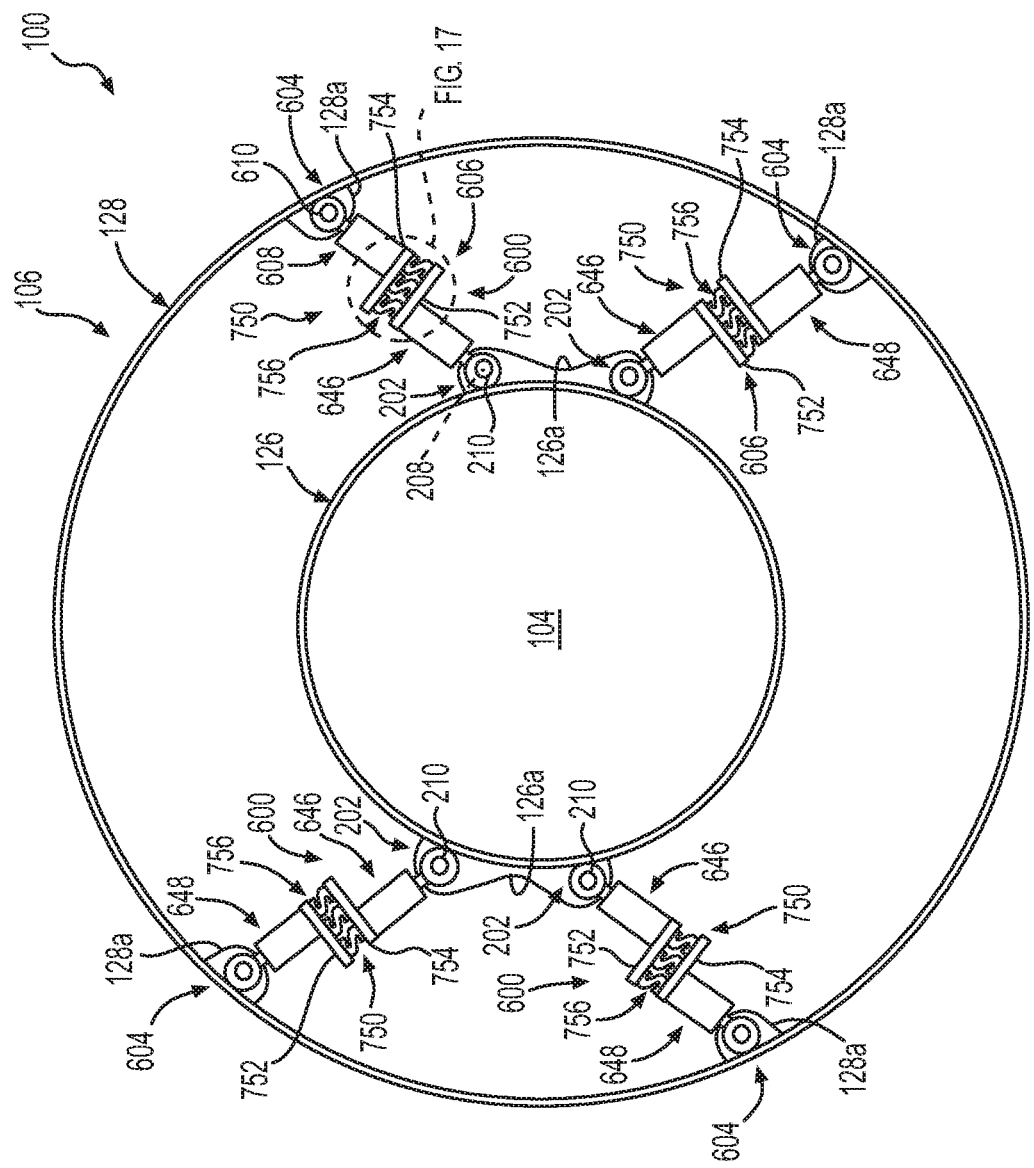
FIG. 16 is a schematic cross-sectional view of the gas turbine engine of FIG. 1, taken from the perspective of line 2-2 of FIG. 1 into the page, in which the plurality of the frangible struts include the body having another exemplary frangible portion, and the plurality of the frangible struts are coupled between the first structure of the gas turbine engine and the second structure of the gas turbine engine, and the gas turbine engine is in a first operating state.
Figure 17:
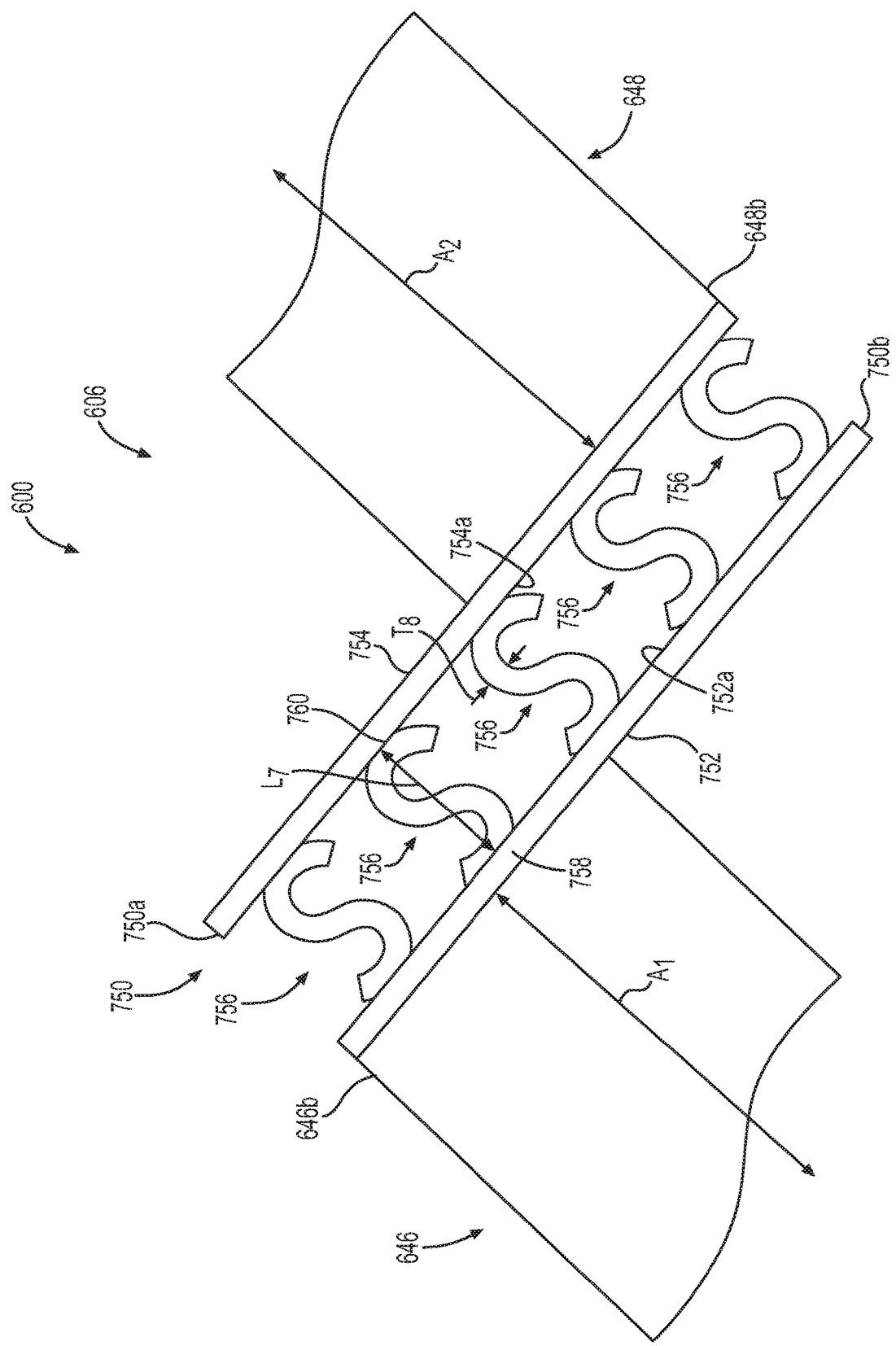
FIG. 17 is a detail front view of the body for the frangible strut of the gas turbine engine, taken at detail 17 of FIG. 16, which illustrates the exemplary frangible portion associated with the frangible strut of FIG. 16 in a first, intact state.

It should be noted that in other embodiments, the frangible portion 650 may be configured differently to release the first main body portion 646 from the second main body portion 648 during the second operating state of the gas turbine engine 100. With reference to FIG. 16, a frangible portion 750 for use with the body 606 of the frangible strut 600 is shown. The frangible portion 750 interconnects the first main body portion 646 and the second main body portion 648. The frangible portion 750 is integrally formed with the first main body portion 646 and the second main body portion 648. With reference to FIG. 17, the frangible portion 750 is shown in greater detail. In this example, the first main body portion 646 extends along the first axis A1, and the second main body portion 648 extends along the second axis A2 such that the second end 646b of the first main body portion 646 is offset from the second end 648b of the second main body portion 648. The frangible portion 750 is defined between the second end 646b of the first main body portion 646 and the second end 648b of the second main body portion 648 to interconnect the second ends 646b, 648b. In this example, the frangible portion 750 comprises a first bar 752, a second bar 754 and a plurality of frangible members 756. The first bar 752 is coupled to or integrally formed with the second end 646b of the first main body portion 646, and extends from the second end 646b of the first main body portion 646 toward the second end 648b. The second bar 754 is coupled to or integrally formed with the second end 648b of the second main body portion 648, and extends from the second end 648b of the second main body portion 648 toward the second end 646b. Thus, the first bar 752 and the second bar 754 are substantially parallel. The first bar 752 is spaced apart from the second bar 754 by the plurality of frangible members 756.

The frangible members 756 interconnect the first bar 752 and the second bar 754, and are each integrally formed with the first bar 752 and the second bar 754. Generally, the frangible members 756 are spaced apart between a first end 750a of the frangible portion 750 and a second end 750b of the frangible portion 750, and extend from an inner surface 752a of the first bar 752 to an inner surface 754a of the second bar 754. It should be noted that while the frangible portion 750 is illustrated herein as having five frangible members 756, the frangible portion 750 may include any number of frangible members 756. In one example, each of the frangible members 756 comprises a solid S-shaped body, which extends between the first bar 752 and the second bar 754. Thus, in this example, each of the frangible members 756 is curved. Each of the frangible members 756 has a first member end 758 and an opposite second member end 760, with an overall length L7 defined between the first member end 758 and the second member end 760. The first member end 758 is coupled to or integrally formed with the first bar 752, and the second member end 760 is coupled to or integrally formed with the second bar 754. Each of the frangible members 756 also have a thickness T8, which is predefined to enable each of the frangible members 756 to break or fracture at a pre-determined threshold force.

Figure 18:
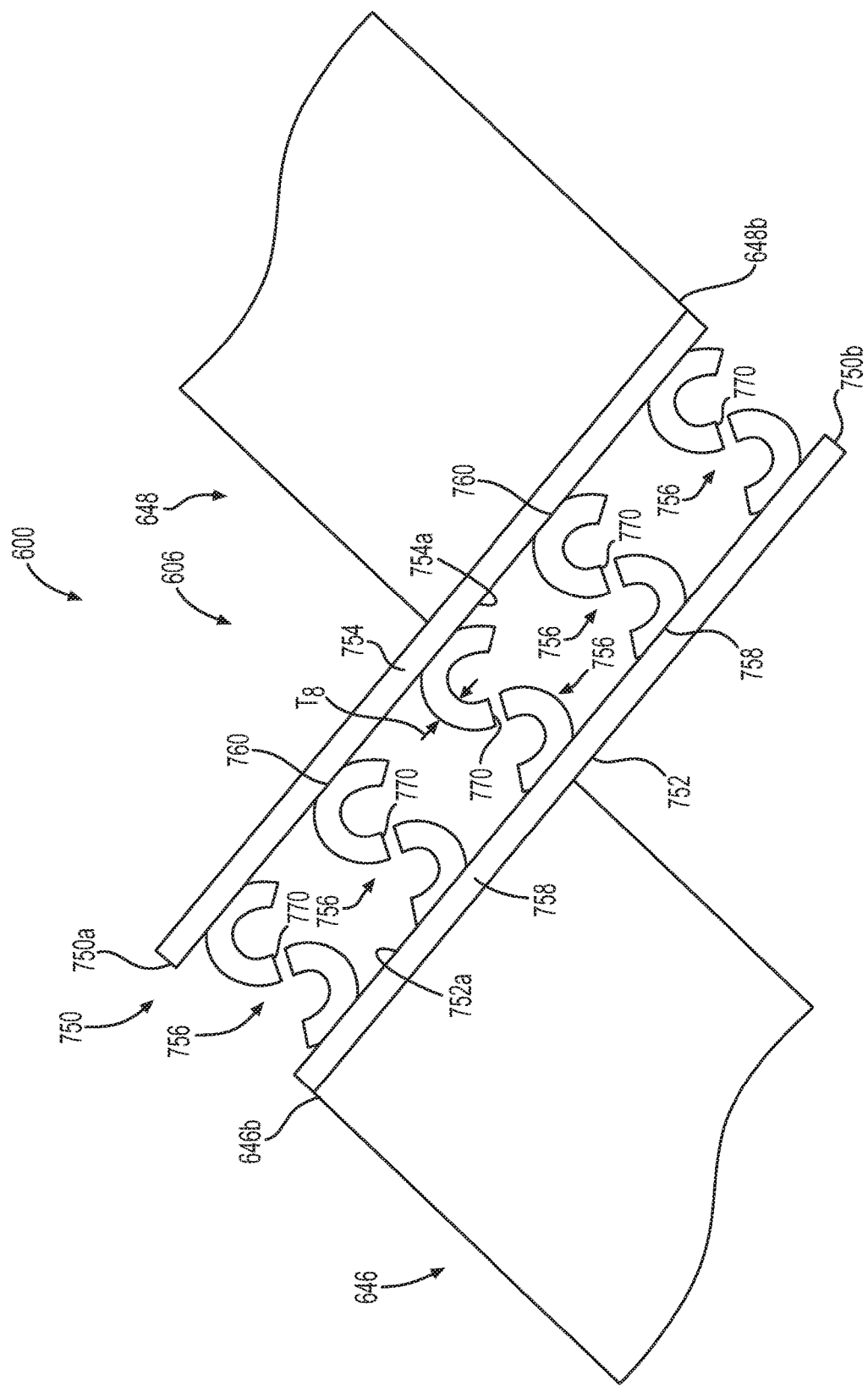
FIG. 18 is a detail front view of the body of the frangible strut of FIG. 16, taken from the perspective of detail 17 of FIG. 16, which illustrates the frangible portion associated with the frangible strut of FIG. 16 in the second, fractured state.

Generally, the frangible members 756 remain in a first, intact state during the first, normal operating state of the gas turbine engine 100 (FIG. 16), and the frangible members 756 are in a second, fractured state in which the frangible members 756 are broken during the second operating state of the gas turbine engine 100 (FIG. 18). For example, each of the frangible members 756 may have the thickness T8 of about 0.15 inches (in.), and are each configured to break or fracture when subjected to a force greater than the pre-defined threshold force of approximately 6000 pounds-force (lbf) of tension or compression along the frangible strut 600. It should be noted that the pre-defined threshold force is merely an example, as the pre-defined threshold force may vary based on the size of the gas turbine engine 100 or the particular application for the frangible strut 600. With reference to FIG. 16, the breaking or fracturing of one or more of the frangible members 756 releases the first bar 752 and the first main body portion 646 from the second bar 754 and the second main body portion 648, which substantially removes a load path between the engine core 104 and the outer bypass duct 106, and reduces a load acting on the outer bypass duct 106.

In one example, with each of the frangible struts 600 formed, the first end 202 of each of the frangible struts 600 is coupled to the first structure or the mounting lugs 126a of the exhaust guide vane 126 of the engine core 104 of the gas turbine engine 100 via the bolt 210. The second end 604 of each of the frangible struts 600 is coupled to the second structure or the mounting lugs 128a of the outer casing 128 of the outer bypass duct 106 of the gas turbine engine 100 via the second bolt 610. With the frangible struts 600 coupled between the engine core 104 and the outer bypass duct 106 of the gas turbine engine 100, in the first, normal operating state of the gas turbine engine 100, the frangible struts 600 reduce rubbing and maintain clearances between rotating components within the engine core 104 and the static structure of the engine core 104, along with maintaining clearances between the engine core 104 and the outer bypass duct 106, which increases performance of the gas turbine engine 100. In the first, normal operating state of the gas turbine engine 100, the frangible portion 750 is in the first, intact state. In the second operating state of the gas turbine engine 100 in which an unexpected load is generated within the engine core 104, for example, once the force applied to the frangible struts 600 exceeds the pre-defined threshold force associated with the frangible portion 750, with reference to FIG. 18, the frangible members 756 of the frangible portion 750 fracture or break, releasing the first main body portion 646 from the second main body portion 648 of the respective frangible strut 600.

FIG. 18 is a detail view of the body 606 with the frangible portion 750 in the second, fractured state. In the second, fractured state, in this example, each of the frangible members 756 is fractured or broken at break 770, thereby releasing the first main body portion 646 from the second main body portion 648. It should be noted that the breaks 770 in the frangible members 756 shown in FIG. 18 are merely exemplary, as the frangible members 756 may fracture or break at any point along the respective frangible member 756 between the first member end 758 and the second member end 760. The release of the first main body portion 646 from the second main body portion 648 substantially removes a load path between the engine core 104 (FIG. 16) and the outer bypass duct 106 (FIG. 16), and also reduces forces acting on the outer bypass duct 106 (FIG. 16).

Figure 19:
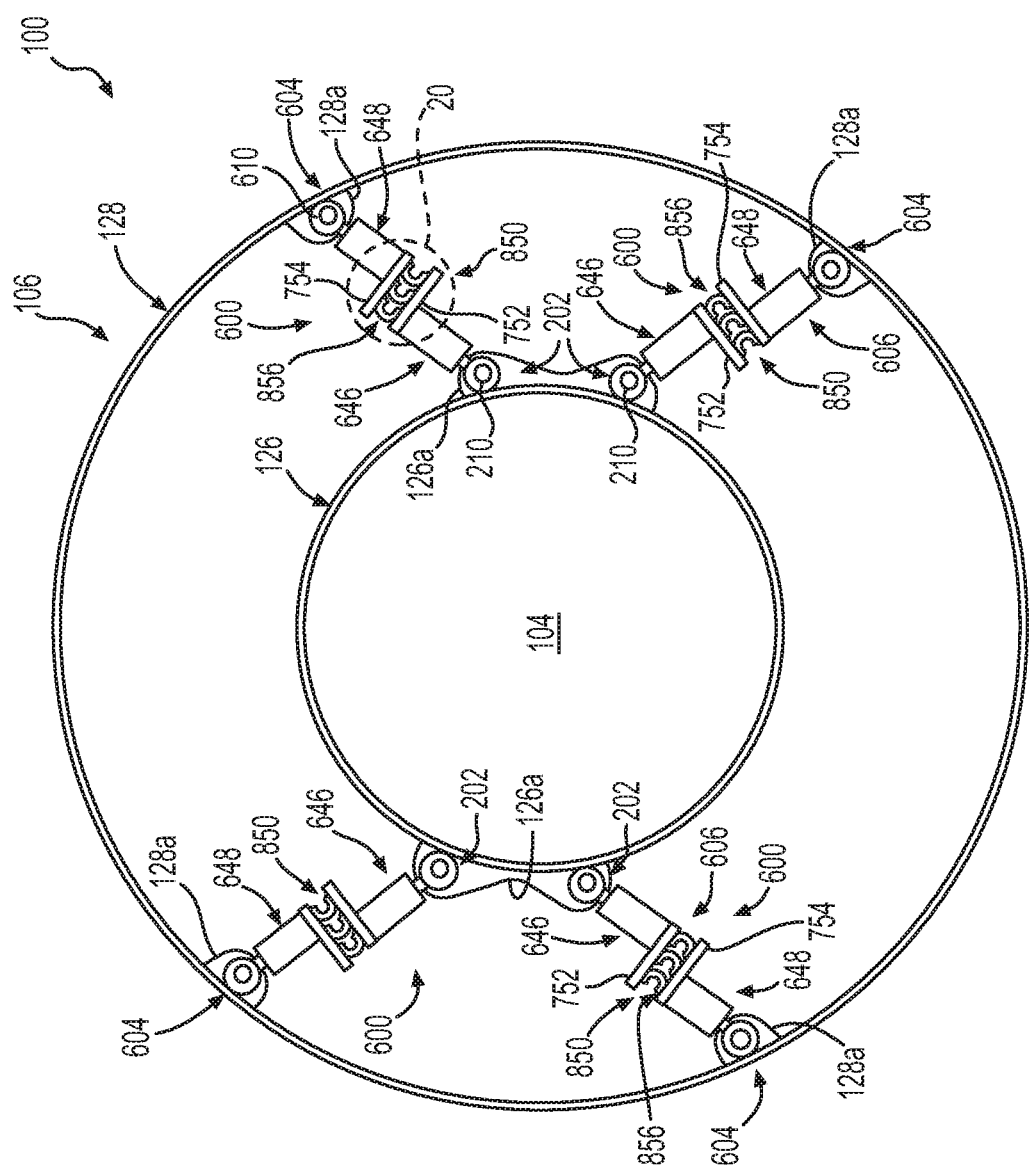
FIG. 19 is a schematic cross-sectional view of the gas turbine engine of FIG. 1, taken from the perspective of line 2-2 of FIG. 1 into the page, in which the plurality of the frangible struts include the body having yet another exemplary frangible portion, and the plurality of the frangible struts are coupled between the first structure of the gas turbine engine and the second structure of the gas turbine engine, and the gas turbine engine is in a first operating state.
Figure 20:
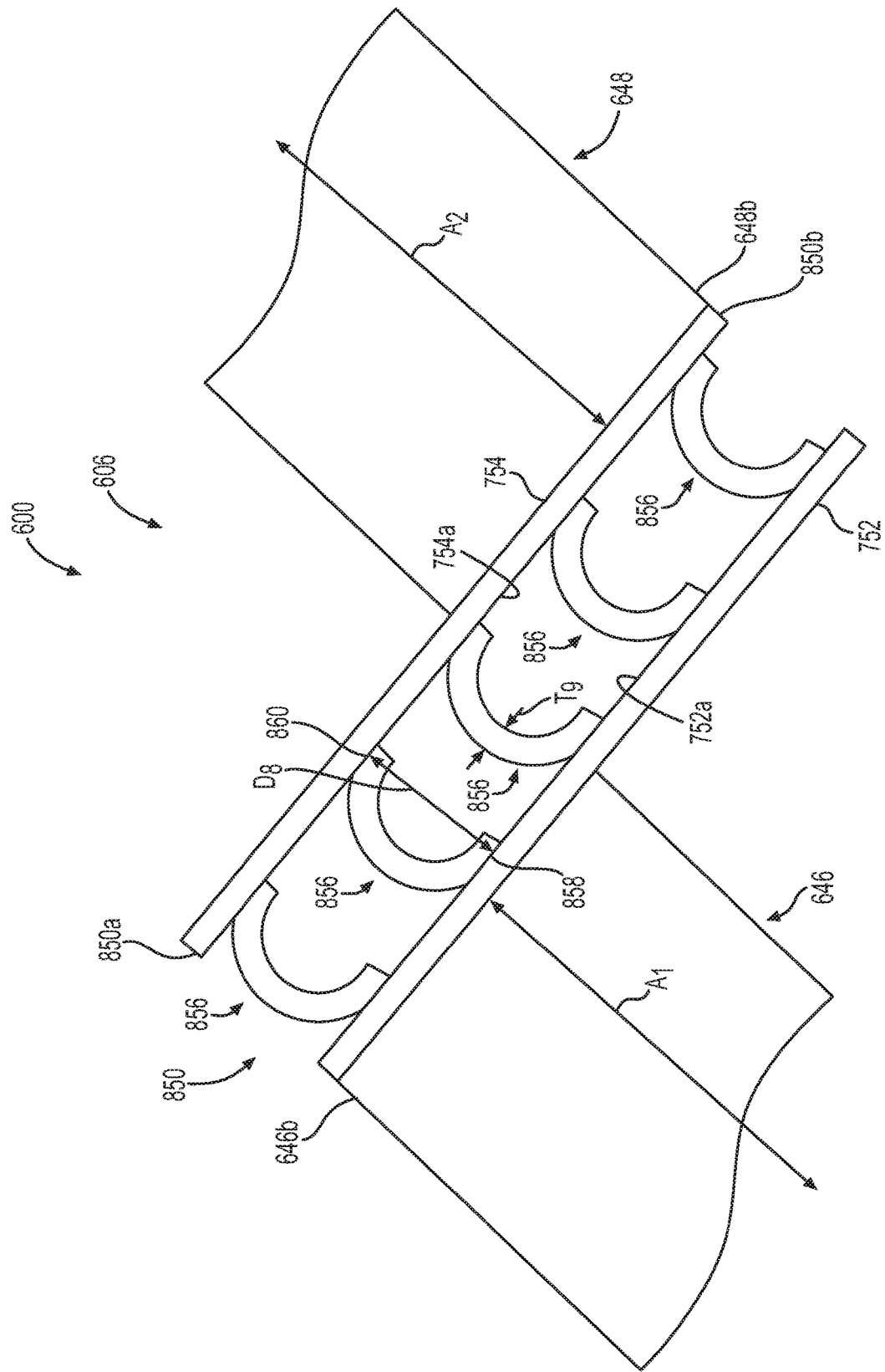
FIG. 20 is a detail front view of the body for the frangible strut of the gas turbine engine, taken at detail 20 of FIG. 19, which illustrates the exemplary frangible portion associated with the frangible strut of FIG. 19 in a first, intact state.

It should be noted that in other embodiments, the frangible portion 650 may be configured differently to release the first main body portion 646 from the second main body portion 648 during the second operating state of the gas turbine engine 100. With reference to FIG. 19, a frangible portion 850 for use with the body 606 of the frangible strut 600 is shown. The frangible portion 850 interconnects the first main body portion 646 and the second main body portion 648. The frangible portion 850 is integrally formed with the first main body portion 646 and the second main body portion 648. With reference to FIG. 20, the frangible portion 850 is shown in greater detail. In this example, the first main body portion 646 extends along the first axis A1, and the second main body portion 648 extends along the second axis A2 such that the second end 646b of the first main body portion 646 is offset from the second end 648b of the second main body portion 648. The frangible portion 850 is defined between the second end 646b of the first main body portion 646 and the second end 648b of the second main body portion 648 to interconnect the second ends 646b, 648b. In this example, the frangible portion 850 comprises the first bar 752, the second bar 754 and a plurality of frangible members 856. The first bar 752 is coupled to or integrally formed with the second end 646b of the first main body portion 646, and the second bar 754 is coupled to or integrally formed with the second end 648b of the second main body portion 648. The first bar 752 is spaced apart from the second bar 754 by the plurality of frangible members 856.

The frangible members 856 interconnect the first bar 752 and the second bar 754, and are each integrally formed with the first bar 752 and the second bar 754. Generally, the frangible members 856 are spaced apart between a first end 850a of the frangible portion 850 and a second end 850b of the frangible portion 850, and extend from the inner surface 752a of the first bar 752 to the inner surface 754a of the second bar 754. It should be noted that while the frangible portion 850 is illustrated herein as having five frangible members 856, the frangible portion 850 may include any number of frangible members 856. In one example, each of the frangible members 856 comprises a solid C-shaped body, which extends between the between the first bar 752 and the second bar 754. Thus, in this example, each of the frangible members 856 is curved. Each of the frangible members 856 has a first member end 858 and an opposite second member end 860, with a diameter D8 defined between the first member end 858 and the second member end 860. The first member end 858 is coupled to or integrally formed with the first bar 752, and the second member end 860 is coupled to or integrally formed with the second bar 754. Each of the frangible members 856 also have a thickness T9, which is predefined to enable each of the frangible members 856 to break or fracture at a pre-determined threshold force.

Figure 21:
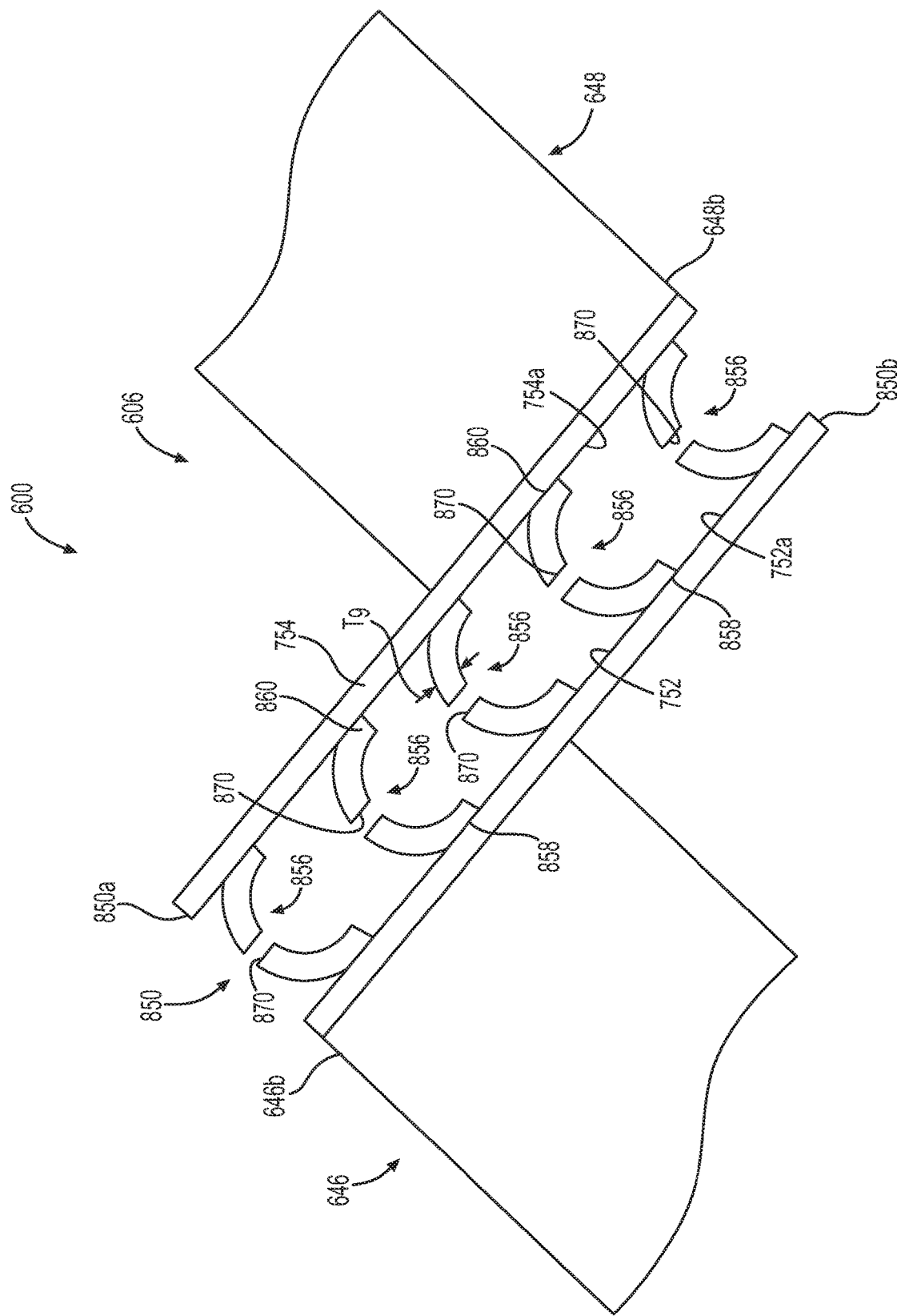
FIG. 21 is a detail front view of the body of the frangible strut of FIG. 19, taken from the perspective of detail 20 of FIG. 19, which illustrates the frangible portion associated with the frangible strut of FIG. 19 in the second, fractured state.

Generally, the frangible members 856 remain in a first, intact state during the first, normal operating state of the gas turbine engine 100 (FIG. 19), and the frangible members 856 are in a second, fractured state in which the frangible members 856 are broken during the second operating state of the gas turbine engine 100 (FIG. 21). For example, each of the frangible members 856 may have the thickness T9 of about 0.15 inches (in.), and are each configured to break or fracture when subjected to a force greater than the pre-defined threshold force of approximately 6000 pounds-force (lbf) of tension or compression along the frangible strut 600. It should be noted that the pre-defined threshold force is merely an example, as the pre-defined threshold force may vary based on the size of the gas turbine engine 100 or the particular application for the frangible strut 600. With reference to FIG. 19, the breaking or fracturing of one or more of the frangible members 856 releases the first bar 752 and the first main body portion 646 from the second bar 754 and the second main body portion 648, which substantially removes a load path between the engine core 104 and the outer bypass duct 106, and reduces a load acting on the outer bypass duct 106.

In one example, with each of the frangible struts 600 formed, the first end 202 of each of the frangible struts 600 is coupled to the first structure or the mounting lugs 126a of the exhaust guide vane 126 of the engine core 104 of the gas turbine engine 100 via the bolt 210. The second end 604 of each of the frangible struts 600 is coupled to the second structure or the mounting lugs 128a of the outer casing 128 of the outer bypass duct 106 of the gas turbine engine 100 via the second bolt 610. With the frangible struts 600 coupled between the engine core 104 and the outer bypass duct 106 of the gas turbine engine 100, in the first, normal operating state of the gas turbine engine 100, the frangible struts 600 reduce rubbing and maintain clearances between rotating components within the engine core 104 and the static structure of the engine core 104, along with maintaining clearances between the engine core 104 and the outer bypass duct 106, which increases performance of the gas turbine engine 100. In the first, normal operating state of the gas turbine engine 100, the frangible portion 850 is in the first, intact state. In the second operating state of the gas turbine engine 100 in which an unexpected load is generated within the engine core 104, for example, once the force applied to the frangible struts 600 exceeds the pre-defined threshold force associated with the frangible portion 850, with reference to FIG. 21, the frangible members 856 of the frangible portion 850 fracture or break, releasing the first main body portion 646 from the second main body portion 648 of the respective frangible strut 600.

FIG. 21 is a detail view of the body 606 with the frangible portion 850 in the second, fractured state. In the second, fractured state, in this example, each of the frangible members 856 is fractured or broken at break 870, thereby releasing the first main body portion 646 from the second main body portion 648. It should be noted that the breaks 870 in the frangible members 856 shown in FIG. 21 are merely exemplary, as the frangible members 856 may fracture or break at any point along the respective frangible member 856 between the first member end 858 and the second member end 860. The release of the first main body portion 646 from the second main body portion 648 substantially removes a load path between the engine core 104 (FIG. 19) and the outer bypass duct 106 (FIG. 19), and also reduces forces acting on the outer bypass duct 106 (FIG. 19).

Figure 22:
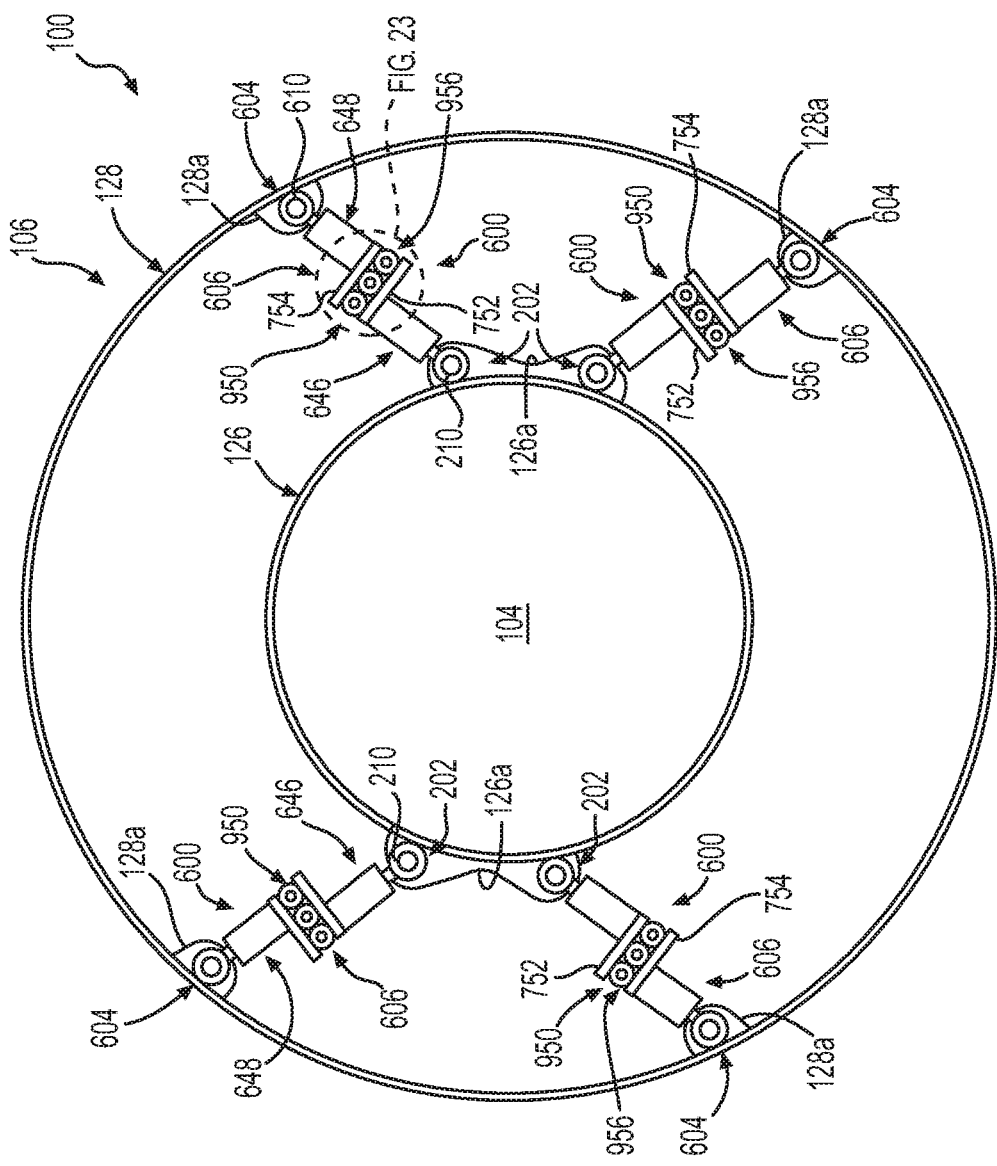
FIG. 22 is a schematic cross-sectional view of the gas turbine engine of FIG. 1, taken from the perspective of line 2-2 of FIG. 1 into the page, in which the plurality of the frangible struts include the body having another exemplary frangible portion, and the plurality of the frangible struts are coupled between the first structure of the gas turbine engine and the second structure of the gas turbine engine, and the gas turbine engine is in a first operating state.
Figure 23:
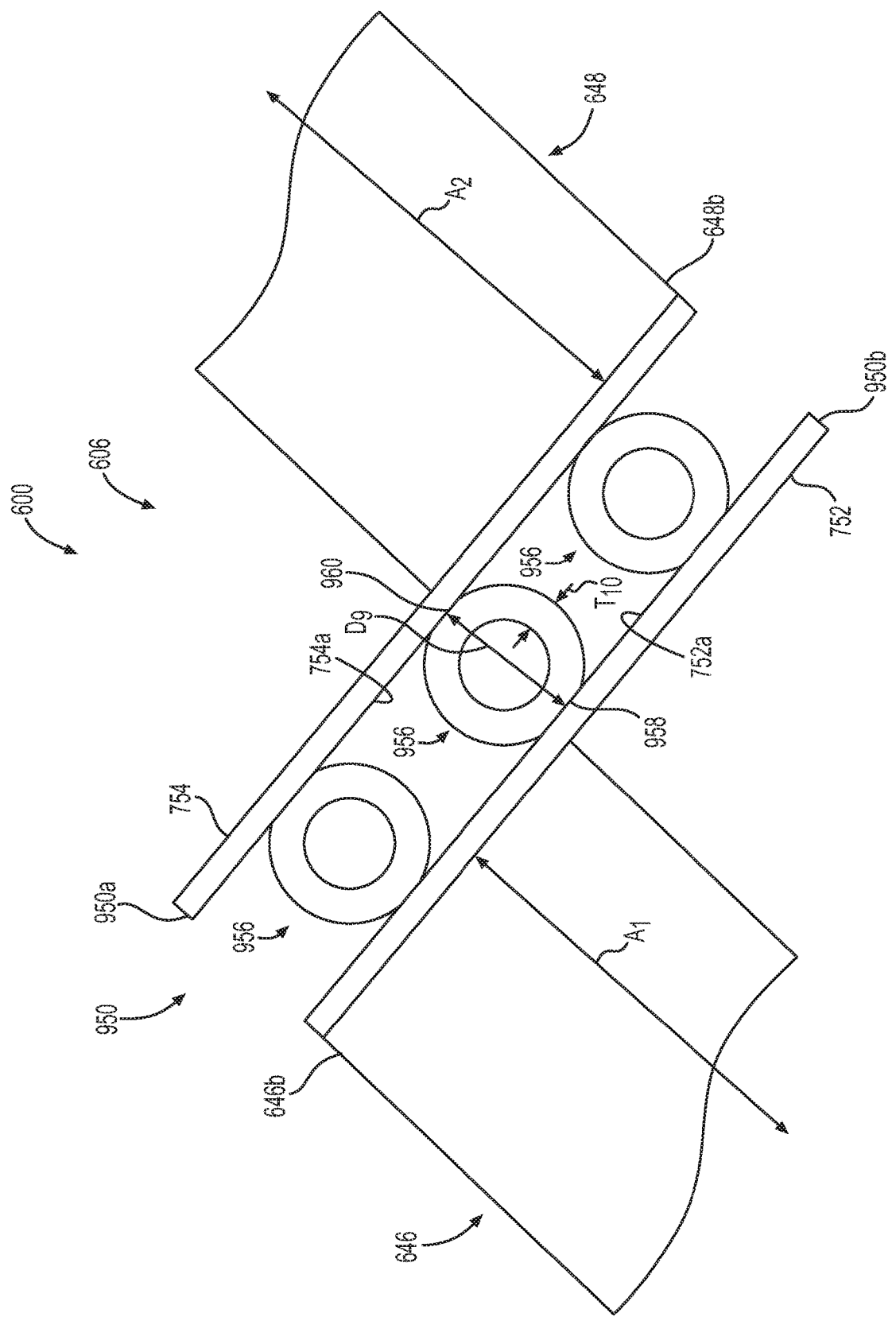
FIG. 23 is a detail front view of the body for the frangible strut of the gas turbine engine, taken at detail 23 of FIG. 22, which illustrates the exemplary frangible portion associated with the frangible strut of FIG. 22 in a first, intact state.

It should be noted that in other embodiments, the frangible portion 650 may be configured differently to release the first main body portion 646 from the second main body portion 648 during the second operating state of the gas turbine engine 100. With reference to FIG. 22, a frangible portion 950 for use with the body 606 of the frangible strut 600 is shown. The frangible portion 950 interconnects the first main body portion 646 and the second main body portion 648. The frangible portion 950 is integrally formed with the first main body portion 646 and the second main body portion 648. With reference to FIG. 23, the frangible portion 950 is shown in greater detail. In this example, the first main body portion 646 extends along the first axis A1, and the second main body portion 648 extends along the second axis A2 such that the second end 646b of the first main body portion 646 is offset from the second end 648b of the second main body portion 648. The frangible portion 950 is defined between the second end 646b of the first main body portion 646 and the second end 648b of the second main body portion 648 to interconnect the second ends 646b, 648b. In this example, the frangible portion 950 comprises the first bar 752, the second bar 754 and a plurality of frangible members 956. The first bar 752 is coupled to or integrally formed with the second end 646b of the first main body portion 646, and the second bar 754 is coupled to or integrally formed with the second end 648b of the second main body portion 648. The first bar 752 is spaced apart from the second bar 754 by the plurality of frangible members 956.

The frangible members 956 interconnect the first bar 752 and the second bar 754, and are each integrally formed with the first bar 752 and the second bar 754. Generally, the frangible members 956 are spaced apart between a first end 950a of the frangible portion 950 and a second end 950b of the frangible portion 950, and extend from the inner surface 752a of the first bar 752 to the inner surface 754a of the second bar 754. It should be noted that while the frangible portion 950 is illustrated herein as having three frangible members 956, the frangible portion 950 may include any number of frangible members 956. In one example, each of the frangible members 956 comprises a ring, which is defined between the first bar 752 and the second bar 754. Each of the frangible members 956 has a first member end 958 and an opposite second member end 960, with a diameter D9 defined between the first member end 958 and the second member end 960. The first member end 958 is coupled to or integrally formed with the first bar 752, and the second member end 960 is coupled to or integrally formed with the second bar 754. Each of the frangible members 956 also have a thickness T10, which is predefined to enable each of the frangible members 956 to break or fracture at a pre-determined threshold force.

Figure 24:
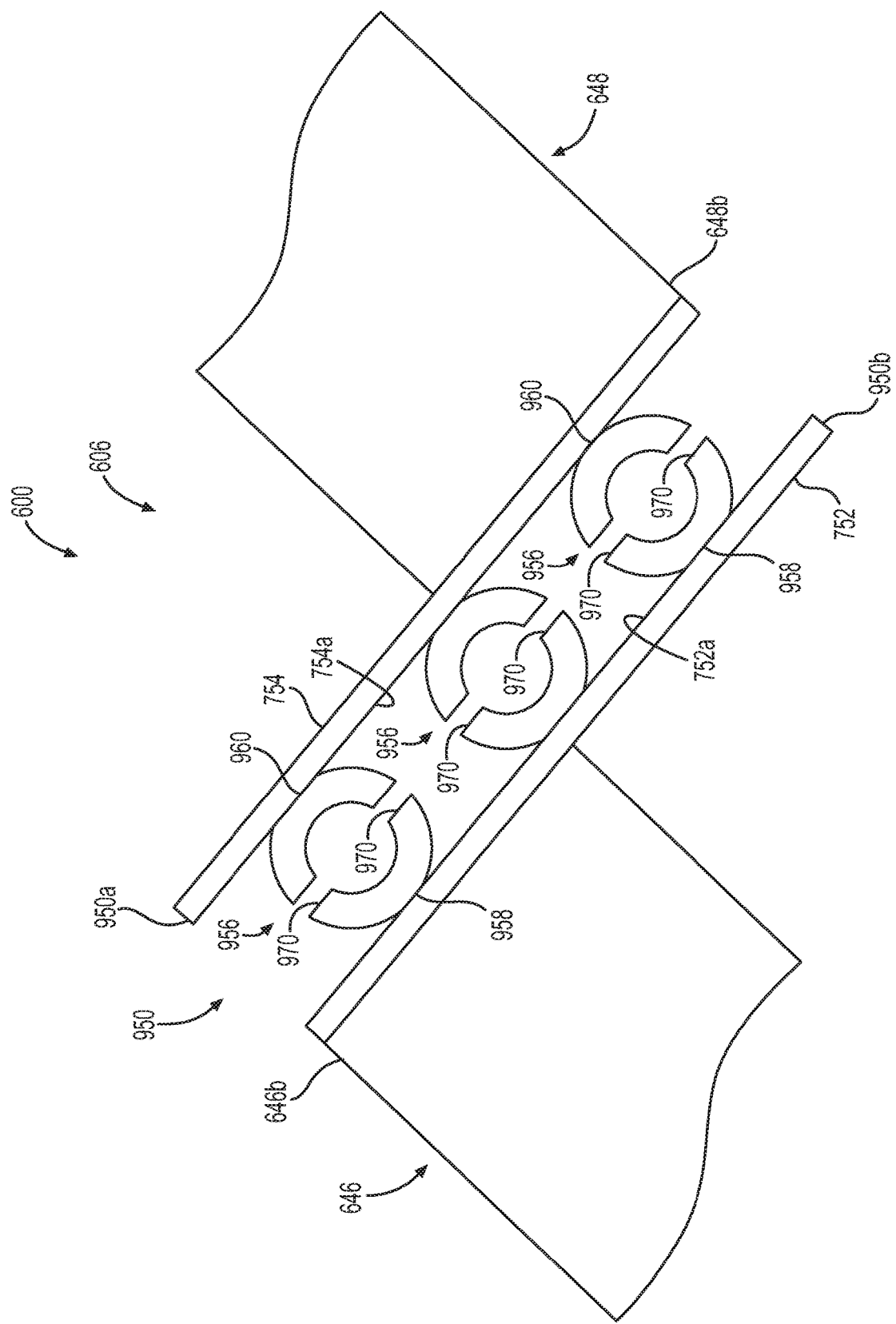
FIG. 24 is a detail front view of the body of the frangible strut of FIG. 22, taken from the perspective of detail 23 of FIG. 22, which illustrates the frangible portion associated with the frangible strut of FIG. 22 in the second, fractured state.

Generally, the frangible members 956 remain in a first, intact state during the first, normal operating state of the gas turbine engine 100 (FIG. 22), and the frangible members 956 are in a second, fractured state in which the frangible members 956 are broken during the second operating state of the gas turbine engine 100 (FIG. 24). For example, each of the frangible members 956 may have the thickness T10 of about 0.15 inches (in.), and are each configured to break or fracture when subjected to a force greater than the pre-defined threshold force of approximately 6000 pounds-force (lbf) of tension or compression along the frangible strut 600. It should be noted that the pre-defined threshold force is merely an example, as the pre-defined threshold force may vary based on the size of the gas turbine engine 100 or the particular application for the frangible strut 600. With reference to FIG. 22, the breaking or fracturing of one or more of the frangible members 956 releases the first bar 752 and the first main body portion 646 from the second bar 754 and the second main body portion 648, which substantially removes a load path between the engine core 104 and the outer bypass duct 106, and reduces a load acting on the outer bypass duct 106.

In one example, with each of the frangible struts 600 formed, the first end 202 of each of the frangible struts 600 is coupled to the first structure or the mounting lugs 126a of the exhaust guide vane 126 of the engine core 104 of the gas turbine engine 100 via the bolt 210. The second end 604 of each of the frangible struts 600 is coupled to the second structure or the mounting lugs 128a of the outer casing 128 of the outer bypass duct 106 of the gas turbine engine 100 via the second bolt 610. With the frangible struts 600 coupled between the engine core 104 and the outer bypass duct 106 of the gas turbine engine 100, in the first, normal operating state of the gas turbine engine 100, the frangible struts 600 reduce rubbing and maintain clearances between rotating components within the engine core 104 and the static structure of the engine core 104, along with maintaining clearances between the engine core 104 and the outer bypass duct 106, which increases performance of the gas turbine engine 100. In the first, normal operating state of the gas turbine engine 100, the frangible portion 950 is in the first, intact state. In the second operating state of the gas turbine engine 100 in which an unexpected load is generated within the engine core 104, for example, once the force applied to the frangible struts 600 exceeds the pre-defined threshold force associated with the frangible portion 950, with reference to FIG. 24, the frangible members 956 of the frangible portion 950 fracture or break, releasing the first main body portion 646 from the second main body portion 648 of the respective frangible strut 600.

FIG. 24 is a detail view of the body 606 with the frangible portion 950 in the second, fractured state. In the second, fractured state, in this example, each of the frangible members 956 is fractured or broken at breaks 970, thereby releasing the first main body portion 646 from the second main body portion 648. It should be noted that the breaks 970 in the frangible members 956 shown in FIG. 24 are merely exemplary, as the frangible members 956 may fracture or break at any point along the respective frangible member 956 between the first member end 958 and the second member end 960. The release of the first main body portion 646 from the second main body portion 648 substantially removes a load path between the engine core 104 (FIG. 22) and the outer bypass duct 106 (FIG. 22), and also reduces forces acting on the outer bypass duct 106 (FIG. 22).

Thus, the frangible struts 200, 600 are configured to remove a load path between the exhaust guide vane 126 of the engine core 104 and the outer bypass duct 106. By removing this load path, the components coupled to the outer bypass duct 106, such as components associated with a thrust reverser assembly, are subjected to reduced loads when the gas turbine engine 100 (FIG. 1) is in the second operating state, such as when an unexpected load is generated within the engine core 104. In one example, by the frangible members 224, 324, 424, 524 or the frangible portion 650, 750, 850, 950, respectively, fracturing or breaking from the first, intact state to the second, fractured state, the frangible struts 200, 600 reduce a shear load acting on a flange of the thrust reverser assembly by about 38%, and reduce a moment load acting on the flange of the thrust reverser assembly by about 40%. Thus, the frangible struts 200, 600 ensure proper operation of the thrust reverser assembly during the second operating state of the gas turbine engine 100. It should be noted that while the gas turbine engine 100 is shown herein as including four of the frangible struts 200, 600, respectively, the gas turbine engine 100 may include any number of the frangible struts 200, 600, and may include a combination of the frangible struts 200, 600. Moreover, in certain instances, the gas turbine engine 100 may include one or more of the frangible struts 200, 600 having the frangible members 224, 324, 424, 524 or the frangible portion 650, 750, 850, 950, respectively, and may include one or more struts that do not include the frangible members 224, 324, 424, 524 or the frangible portion 650, 750, 850, 950. Further, while the second end 204 is shown connected to the outer bypass duct 106 and associated with the frangible members 224, 324, 424, 524, the orientation of the frangible strut 200 may be reversed, such that the second end 204, including the frangible members 224, 324, 424, 524, is coupled to the exhaust guide vane 126 of the engine core 104. In addition, while the frangible strut 600 is shown with the frangible portion 650, 750, 850, 950 defined substantially in a center of the body 606, the frangible portion 650, 750, 850, 950 may be defined in the body 606 at any location between the first end 202 and the second end 604 of the frangible strut 600, and thus, the location illustrated herein for the frangible portion 650, 750, 850, 950 is merely an example. Moreover, while the frangible strut 200, 600 is shown and described herein as being composed of a single material, the frangible strut 200, 600 may be composed of multiple materials. Additionally, the second end 204 of the frangible strut 200 may include any combination of the frangible members 224, 324, 424, 524, and the frangible portion 750, 850, 950 of the frangible strut 600 may include any combination of the frangible members 756, 856, 956.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A frangible strut for a gas turbine engine, comprising:
   a first end to couple to a first structure of the gas turbine engine;
   a second end opposite the first end, the second end to couple to a second structure of the gas turbine engine; and
   a body interconnecting the first end and the second end, the body including a first body portion and a second body portion, the first body portion extending along a first axis, the second body portion extending along a second axis, the first axis different than and parallel to the second axis, the first body portion interconnected to the second body portion by a frangible portion and the frangible portion is configured to release the first body portion from the second body portion.

2. The frangible strut of claim 1, wherein the frangible portion is a bar that interconnects the first body portion and the second body portion, and the bar is configured to release the first body portion from the second body portion.

3. The frangible strut of claim 1, wherein the frangible portion includes a first bar, a second bar and a plurality of frangible members, the first bar spaced apart from and interconnected to the second bar by the plurality of frangible members, each of the plurality of frangible members configured to release the first body portion from the second body portion.

4. The frangible strut of claim 3, wherein each of the plurality of frangible members is curved.

5. The frangible strut of claim 3, wherein each of the plurality of frangible members is a ring.

6. A gas turbine engine, comprising:
   an exhaust guide vane of an engine core;
   an outer bypass duct spaced apart from the exhaust guide vane; and
   at least one frangible strut having a first end coupled to the exhaust guide vane and a second end coupled to the outer bypass duct, the second end opposite the first end, with a body that interconnects the first end and the second end, and the body includes a plurality of frangible members configured to remove a load path from the exhaust guide vane to the outer bypass duct.

7. The gas turbine engine of claim 6, wherein the body comprises a first body portion and a second body portion, the first body portion extending along a first axis, the second body portion extending along a second axis, the first axis different than and parallel to the second axis, the first body portion interconnected to the second body portion by a frangible portion that includes a first bar, a second bar and the plurality of frangible members.

8. The gas turbine engine of claim 7, wherein the first bar is spaced apart from and interconnected to the second bar by the plurality of frangible members, and each of the plurality of frangible members is configured to release the first body portion from the second body portion to remove the load path.

9. The gas turbine engine of claim 7, wherein each of the plurality of frangible members is curved.

10. The gas turbine engine of claim 7, wherein each of the plurality of frangible members is a ring.

11. A gas turbine engine, comprising:
    a first structure;
    a second structure spaced apart from the first structure; and
    at least one frangible strut having a first end coupled to the first structure and a second end coupled to the second structure, the second end opposite the first end, with a body that interconnects the first end and the second end, the body including a first body portion interconnected to a second body portion by a frangible portion configured to remove a load path from the first structure to the second structure, the first body portion extends along a first axis, the second body portion extends along a second axis, and the first axis is different than and parallel to the second axis.

12. The gas turbine engine of claim 11, wherein the frangible portion is a bar that interconnects the first body portion and the second body portion, and the bar is configured to release the first body portion from the second body portion.

13. The gas turbine engine of claim 11, wherein the frangible portion includes a first bar, a second bar and a plurality of frangible members.

14. The gas turbine engine of claim 13, wherein the first bar is spaced apart from and interconnected to the second bar by the plurality of frangible members, and each of the plurality of frangible members is configured to release the first body portion from the second body portion to remove the load path.

15. The gas turbine engine of claim 13, wherein each of the plurality of frangible members is curved.

16. The gas turbine engine of claim 13, wherein each of the plurality of frangible members is a ring.

17. The gas turbine engine of claim 11, wherein the first end is coupled to an exhaust guide vane of an engine core of the gas turbine engine and the second end is coupled to an outer bypass duct of the gas turbine engine.

* * * * *